US012707391B2

(12) United States Patent
Abotabl et al.

(10) Patent No.: US 12,707,391 B2
(45) Date of Patent: Aug. 11, 2026

(54) CONTROL CHANNEL MONITORING ADAPTATION UNDER A SEQUENCE OF NETWORK OPERATIONS

(71) Applicant: QUALCOMM Incorporated, San Diego, CA (US)

(72) Inventors: Ahmed Attia Abotabl, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 672 days.

(21) Appl. No.: 17/960,752

(22) Filed: Oct. 5, 2022

(65) Prior Publication Data

US 2024/0121715 A1 Apr. 11, 2024

(51) Int. Cl.
*H04W 52/02* (2009.01)

(52) U.S. Cl.
CPC ... *H04W 52/0235* (2013.01); *H04W 52/0274* (2013.01)

(58) Field of Classification Search
CPC ......... H04W 52/0235; H04W 52/0274; H04W 52/0216; H04W 52/0229; H04W 52/0206; Y02D 30/70
See application file for complete search history.

(56) References Cited

U.S. PATENT DOCUMENTS

2018/0279272 A1* 9/2018 Bhattad ................... H04W 4/70
2021/0227496 A1* 7/2021 Ly ......................... H04W 76/27
2022/0078707 A1* 3/2022 Zhou ..................... H04W 76/28
2022/0124623 A1* 4/2022 Seo ....................... H04W 72/23
2022/0150946 A1* 5/2022 Tsai ...................... H04W 76/28
2022/0400451 A1* 12/2022 Luo ....................... H04W 48/16

FOREIGN PATENT DOCUMENTS

WO WO-2020198356 A1 10/2020

OTHER PUBLICATIONS

International Search Report and Written Opinion—PCT/US2023/073575—ISA/EPO—Feb. 5, 2024.

* cited by examiner

*Primary Examiner* — Kwang B Yao
*Assistant Examiner* — Patrick Yipao Pei
(74) *Attorney, Agent, or Firm* — Holland & Hart LLP

(57) ABSTRACT

Methods, systems, and devices for wireless communication are described. In a wireless communications system, a network entity may configure a set of monitoring occasion configurations that correspond to (e.g., are linked to) a set of energy saving modes. A user equipment (UE) may receive control signaling from the network entity indicating the configuration, and the UE may switch from a first energy saving mode to a second energy saving mode. Based on the switching, and because the energy saving modes are linked to the monitoring occasion configurations, the UE may switch from a first monitoring occasion configuration corresponding to the first energy saving mode to a second monitoring occasion configuration corresponding to the second energy saving mode. The UE may monitor a control channel in accordance with the second monitoring occasion configuration.

30 Claims, 17 Drawing Sheets

Transmit control signaling indicating a set of monitoring occasion configurations, wherein a first monitoring occasion configuration is associated with a first energy saving mode of a set of energy saving modes, and wherein a second monitoring occasion configuration is associated with a second energy saving mode of the set of energy saving modes

1605

Transmit a control channel in accordance with the second monitoring occasion configuration based at least in part on a UE switching from the first energy saving mode to the second energy saving mode

1610

1600

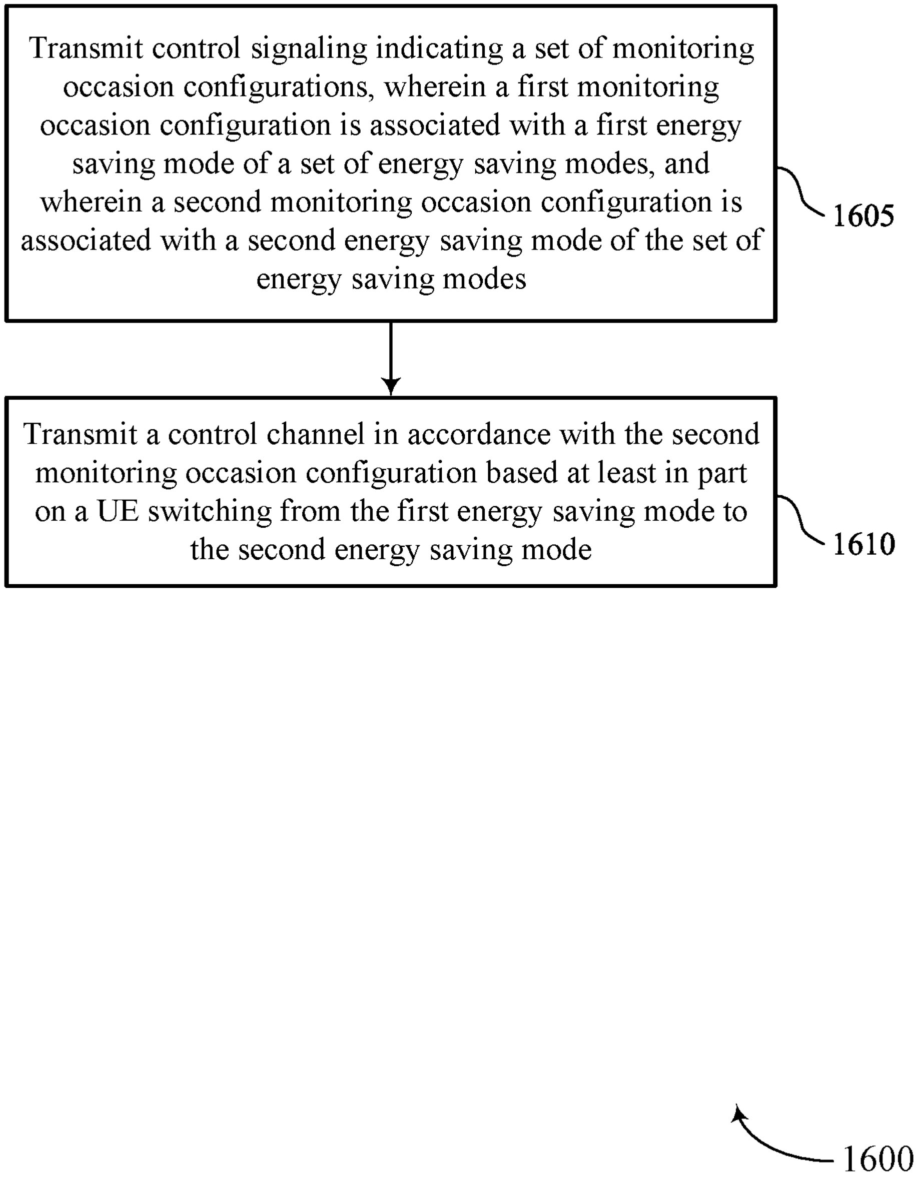

FIG. 16

Transmit control signaling indicating a distribution associated with a second monitoring occasion configuration that indicates a set of intervals across an active time of the second energy saving mode, wherein an interval of the set of intervals comprises one or more monitoring occasions, and wherein the distribution is based at least in part on sub-sampling the one or more monitoring occasions, muting the one or more monitoring occasions, or both

1705

Transmit a control channel in accordance with the second monitoring occasion configuration based at least in part on a UE switching from the first energy saving mode to the second energy saving mode

1710

1700

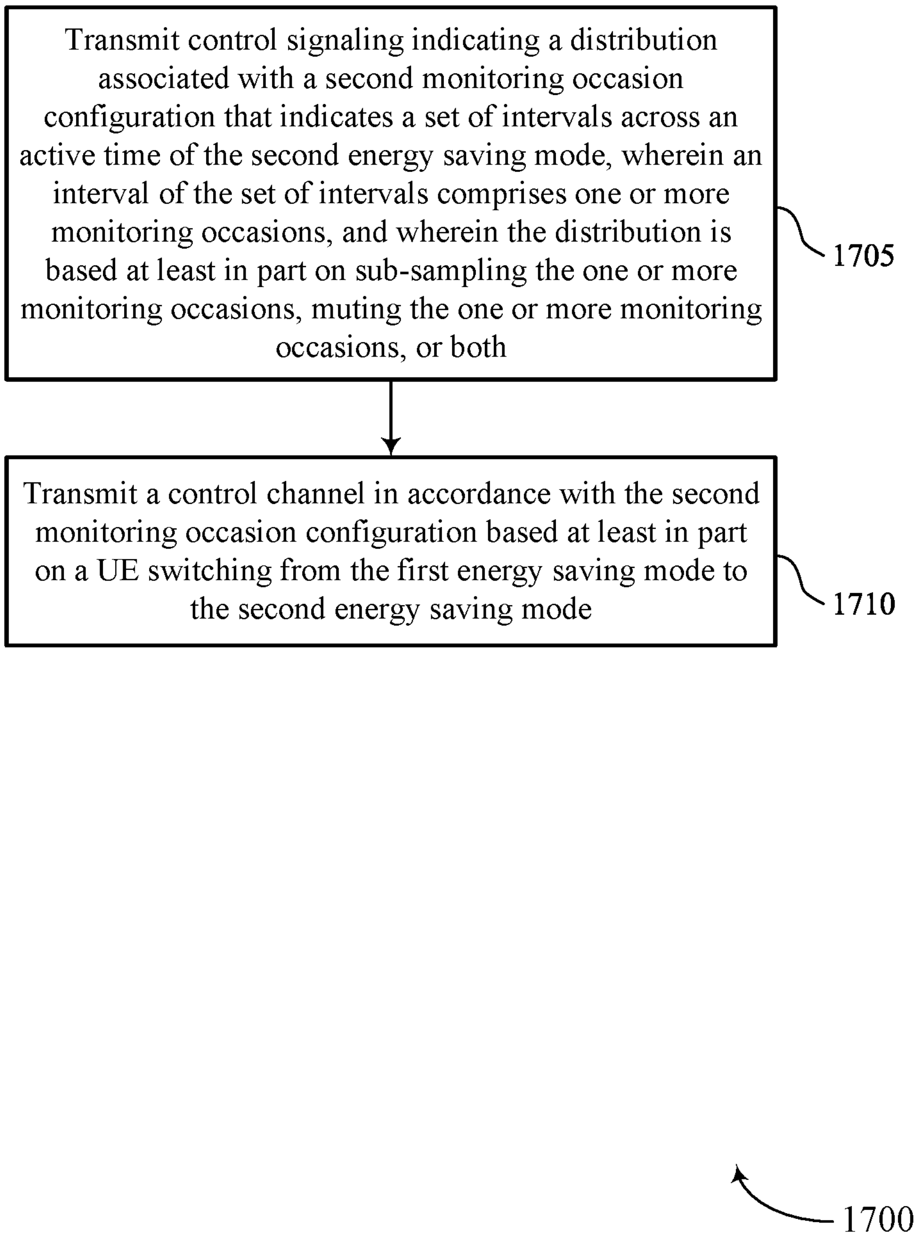

FIG. 17

CONTROL CHANNEL MONITORING ADAPTATION UNDER A SEQUENCE OF NETWORK OPERATIONS

FIELD OF TECHNOLOGY

The following relates to wireless communication, including control channel monitoring adaptation under a sequence of network operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a UE may operate in an energy saving mode to save power. In some cases, however, techniques for switching between operating in different energy saving modes may be improved.

SUMMARY

The described techniques relate to improved methods, systems, devices, and apparatuses that support control channel monitoring adaptation under a sequence of network operations. For example, the described techniques provide for linking control channel monitoring occasions with energy saving modes (also referred to as network energy saving modes) such that a user equipment (UE) may implicitly switch from one monitoring occasion to another based on switching from one energy saving mode to another. A network entity may configure the UE with a set of energy saving modes, where each energy saving mode is associated with a monitoring occasion configuration. In some examples, a monitoring occasion configuration may include a control resource set (CORESET) configuration and a search space configuration. When the UE switches between energy saving modes, the UE may also implicitly switch between corresponding monitoring occasion configurations. That is, the network entity may refrain from transmitting downlink control information (DCI) or other dynamic signaling to the UE each time the UE is to switch from one energy saving mode to another, thereby reducing overhead for the UE and improving energy and power efficiency of the wireless communications system.

A method for wireless communication at a UE is described. The method may include receiving control signaling indicating a set of monitoring occasion configurations, where a first monitoring occasion configuration corresponds to a first energy saving mode of a set of energy saving modes, switching from the first energy saving mode to a second energy saving mode, switching from the first monitoring occasion configuration corresponding to the first energy saving mode to a second monitoring occasion configuration corresponding to the second energy saving mode based on switching from the first energy saving mode to the second energy saving mode, and monitoring a control channel in accordance with the second monitoring occasion configuration.

An apparatus for wireless communication at a UE is described. The apparatus may include a processor, and memory coupled with the processor, with instructions stored in the memory, the instructions being executable by the processor to cause the apparatus to receive control signaling indicating a set of monitoring occasion configurations, where a first monitoring occasion configuration corresponds to a first energy saving mode of a set of energy saving modes, switch from the first energy saving mode to a second energy saving mode, switch from the first monitoring occasion configuration corresponding to the first energy saving mode to a second monitoring occasion configuration corresponding to the second energy saving mode based on switching from the first energy saving mode to the second energy saving mode, and monitor a control channel in accordance with the second monitoring occasion configuration.

Another apparatus for wireless communication at a UE is described. The apparatus may include means for receiving control signaling indicating a set of monitoring occasion configurations, where a first monitoring occasion configuration corresponds to a first energy saving mode of a set of energy saving modes, means for switching from the first energy saving mode to a second energy saving mode, means for switching from the first monitoring occasion configuration corresponding to the first energy saving mode to a second monitoring occasion configuration corresponding to the second energy saving mode based on switching from the first energy saving mode to the second energy saving mode, and means for monitoring a control channel in accordance with the second monitoring occasion configuration.

A non-transitory computer-readable medium storing code for wireless communication at a UE is described. The code may include instructions executable by a processor to receive control signaling indicating a set of monitoring occasion configurations, where a first monitoring occasion configuration corresponds to a first energy saving mode of a set of energy saving modes, switch from the first energy saving mode to a second energy saving mode, switch from the first monitoring occasion configuration corresponding to the first energy saving mode to a second monitoring occasion configuration corresponding to the second energy saving mode based on switching from the first energy saving mode to the second energy saving mode, and monitor a control channel in accordance with the second monitoring occasion configuration.

In some examples of the method, apparatuses, and non-transitory computer-readable medium described herein, receiving the control signaling may include operations, features, means, or instructions for receiving the control signaling indicating a set of CORESET configurations and a set of search space configurations, where a first CORESET configuration and a first search space configuration may be associated with the first energy saving mode, and where the first monitoring occasion configuration includes the first CORESET configuration and the first search space configuration.

In some examples of the method, apparatuses, and non-transitory computer-readable medium described herein, switching from the first monitoring occasion configuration to the second monitoring occasion configuration may include operations, features, means, or instructions for switching from a first CORESET configuration and a first search space configuration to a second CORESET configuration and a second search space configuration associated with the second energy saving mode based on switching from the first energy saving mode to the second energy saving mode, where the second monitoring occasion configuration includes the second CORESET configuration and the second search space configuration.

Some examples of the method, apparatuses, and non-transitory computer-readable medium described herein may further include operations, features, means, or instructions for switching from a first search space group associated with the first monitoring occasion configuration to a second search space group associated with the second monitoring occasion configuration based on switching from the first energy saving mode to the second energy saving mode and monitoring the control channel in accordance with the second search space group.

In some examples of the method, apparatuses, and non-transitory computer-readable medium described herein, receiving the control signaling may include operations, features, means, or instructions for receiving the control signaling indicating one or more offsets, where the second monitoring occasion configuration may be based on at least one or the one or more offsets being applied to a BWP configuration.

In some examples of the method, apparatuses, and non-transitory computer-readable medium described herein, the one or more offsets includes a time offset, a frequency offset, a periodicity offset, or any combination thereof.

In some examples of the method, apparatuses, and non-transitory computer-readable medium described herein, receiving the control signaling may include operations, features, means, or instructions for receiving the control signaling indicating a periodicity of the second monitoring occasion configuration, where the periodicity may be based on a BWP configuration and a periodicity offset.

In some examples of the method, apparatuses, and non-transitory computer-readable medium described herein, receiving the control signaling may include operations, features, means, or instructions for receiving the control signaling indicating a distribution associated with the second monitoring occasion configuration that indicates a set of intervals across an active time of the second energy saving mode, where an interval of the set of intervals includes one or more monitoring occasions.

In some examples of the method, apparatuses, and non-transitory computer-readable medium described herein, the distribution may be based on sub-sampling the one or more monitoring occasions, muting the one or more monitoring occasions, or both.

A method for wireless communication at a network entity is described. The method may include transmitting control signaling indicating a set of monitoring occasion configurations, where a first monitoring occasion configuration is associated with a first energy saving mode of a set of energy saving modes, and where a second monitoring occasion configuration is associated with a second energy saving mode of the set of energy saving modes and transmitting a control channel in accordance with the second monitoring occasion configuration based on a UE switching from the first energy saving mode to the second energy saving mode.

An apparatus for wireless communication at a network entity is described. The apparatus may include a processor, and memory coupled with the processor, with instructions stored in the memory, the instructions being executable by the processor to cause the apparatus to transmit control signaling indicating a set of monitoring occasion configurations, where a first monitoring occasion configuration is associated with a first energy saving mode of a set of energy saving modes, and where a second monitoring occasion configuration is associated with a second energy saving mode of the set of energy saving modes and transmit a control channel in accordance with the second monitoring occasion configuration based on a UE switching from the first energy saving mode to the second energy saving mode.

Another apparatus for wireless communication at a network entity is described. The apparatus may include means for transmitting control signaling indicating a set of monitoring occasion configurations, where a first monitoring occasion configuration is associated with a first energy saving mode of a set of energy saving modes, and where a second monitoring occasion configuration is associated with a second energy saving mode of the set of energy saving modes and means for transmitting a control channel in accordance with the second monitoring occasion configuration based on a UE switching from the first energy saving mode to the second energy saving mode.

A non-transitory computer-readable medium storing code for wireless communication at a network entity is described. The code may include instructions executable by a processor to transmit control signaling indicating a set of monitoring occasion configurations, where a first monitoring occasion configuration is associated with a first energy saving mode of a set of energy saving modes, and where a second monitoring occasion configuration is associated with a second energy saving mode of the set of energy saving modes and transmit a control channel in accordance with the second monitoring occasion configuration based on a UE switching from the first energy saving mode to the second energy saving mode.

In some examples of the method, apparatuses, and non-transitory computer-readable medium described herein, transmitting the control signaling may include operations, features, means, or instructions for transmitting the control signaling indicating a set of CORESET configurations and a set of search space configurations, where a first CORESET configuration and a first search space configuration may be associated with the first energy saving mode, and where the first monitoring occasion configuration includes the first CORESET configuration and the first search space configuration.

In some examples of the method, apparatuses, and non-transitory computer-readable medium described herein, transmitting the control signaling may include operations, features, means, or instructions for transmitting the control signaling indicating one or more offsets, where the second monitoring occasion configuration may be based on at least one or the one or more offsets being applied to a BWP configuration.

In some examples of the method, apparatuses, and non-transitory computer-readable medium described herein, the one or more offsets includes a time offset, a frequency offset, a periodicity offset, or any combination thereof.

In some examples of the method, apparatuses, and non-transitory computer-readable medium described herein, transmitting the control signaling may include operations, features, means, or instructions for transmitting the control signaling indicating a periodicity of the second monitoring occasion configuration, where the periodicity may be based on a BWP configuration and a periodicity offset.

In some examples of the method, apparatuses, and non-transitory computer-readable medium described herein, transmitting the control signaling may include operations, features, means, or instructions for transmitting the control signaling indicating a distribution associated with the second monitoring occasion configuration that indicates a set of intervals across an active time of the second energy saving mode, where an interval of the set of intervals includes one or more monitoring occasions.

In some examples of the method, apparatuses, and non-transitory computer-readable medium described herein, the distribution may be based on sub-sampling the one or more monitoring occasions, muting the one or more monitoring occasions, or both.

BRIEF DESCRIPTION OF THE DRAWINGS

FIGS. 13 through 17 show flowcharts illustrating methods that support control channel monitoring adaptation under a sequence of network operations in accordance with one or more aspects of the present disclosure.

DETAILED DESCRIPTION

Figure 1:
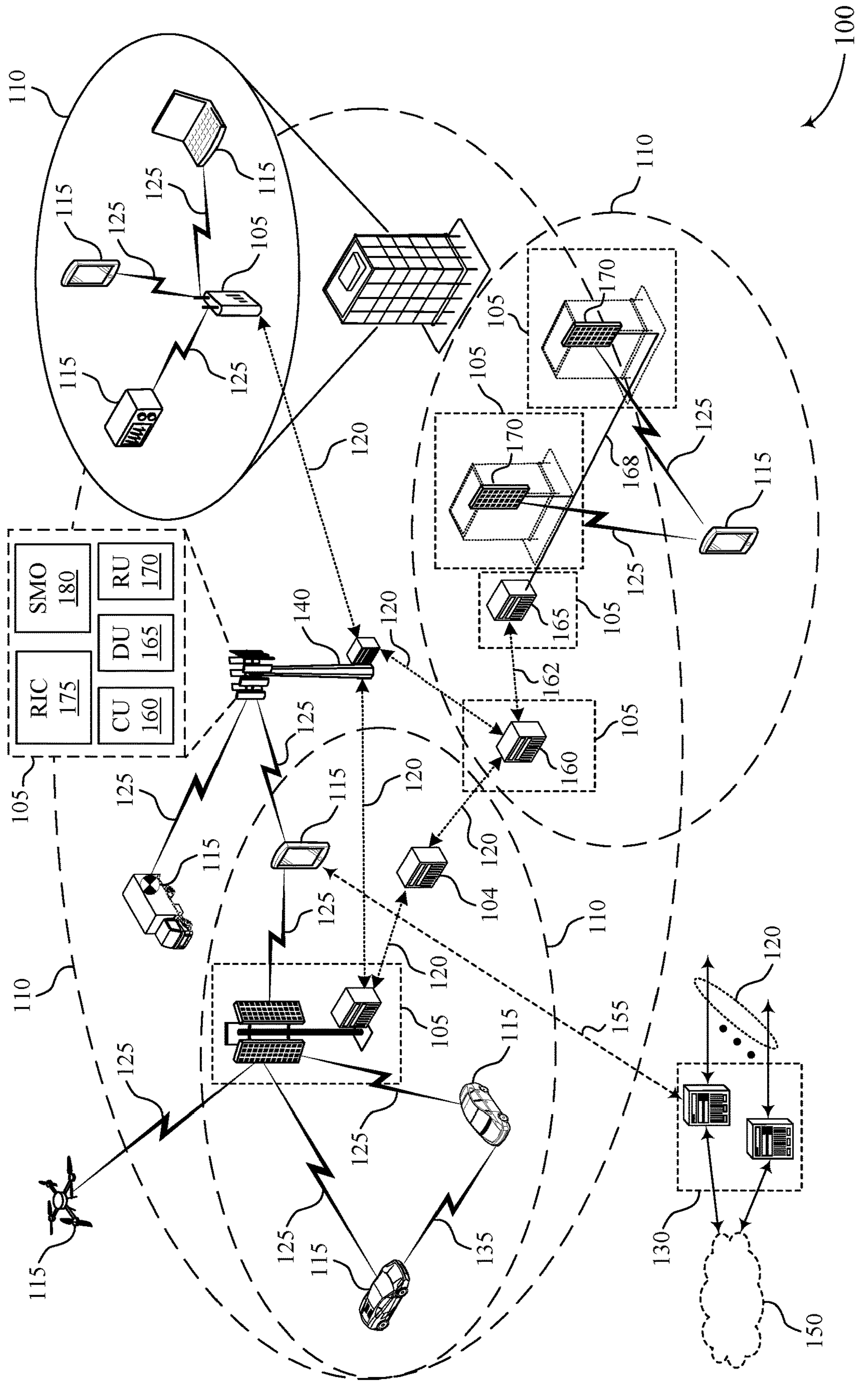
FIG. 1 illustrates an example of a wireless communications system that supports control channel monitoring adaptation under a sequence of network operations in accordance with one or more aspects of the present disclosure.

In some wireless communications systems, a user equipment (UE) and a network entity may operate in different network energy saving modes to save power. In some cases, the network entity may transmit signaling to the UE indicating a network energy saving mode in which the UE is to operate based on current traffic conditions. That is, the network entity may enable dynamic switching of network energy saving modes to fit traffic loads of the UE, which may be useful in applications where a distribution of data arrival times is highly expected. For example, if low traffic loads are expected at the UE, the network entity may configure the UE to operate in a particular network energy saving mode that may turn off some functionalities of the UE (that may be underutilized because of the low traffic loads), such that the UE may save power until higher traffic loads are expected.

However, some data and traffic may be subject to random jitter, and as such, may be associated with inconsistent or variable arrival times. Using dynamic switching, if large amounts of data with variable arrival times are scheduled for transmission to the UE, the network entity may transmit more signaling to the UE, increasing signaling overhead and power consumption at the UE as the UE receives and processes more information from the network entity. For example, the network entity may dynamically switch a network energy saving mode of the UE per bandwidth part (BWP) for a transmission, which may be inefficient and resource intensive.

The techniques described herein provide for linking control channel monitoring occasions with energy saving modes (also referred to as network energy saving modes) such that a UE may implicitly switch from one monitoring occasion to another based on switching from one energy saving mode to another. A network entity may configure the UE with a set of energy saving modes, where each energy saving mode is associated with a monitoring occasion configuration. In some examples, a monitoring occasion configuration may include a control resource set (CORESET) configuration and a search space configuration. When the UE switches between energy saving modes, the UE may also implicitly switch between corresponding monitoring occasion configurations. That is, the network entity may refrain from transmitting downlink control information (DCI) or other dynamic signaling to the UE each time the UE is to switch from one energy saving mode to another, thereby reducing overhead for the UE and improving energy and power efficiency of the wireless communications system. In some examples, the network entity may configure the monitoring occasion configurations (including CORESET configurations and search space configurations) such that they are offset from a BWP configuration or based on a distribution across an active time of a given energy saving mode.

Aspects of the disclosure are initially described in the context of wireless communications systems. Aspects of the disclosure are then described in the context of monitoring configurations and process flows. Aspects of the disclosure are further illustrated by and described herein with reference to apparatus diagrams, system diagrams, and flowcharts that relate to control channel monitoring adaptation under a sequence of network operations.

FIG. 1 illustrates an example of a wireless communications system 100 that supports control channel monitoring adaptation under a sequence of network operations in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support control channel monitoring adaptation under a sequence of network operations as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

Some wireless communications systems 100 may employ network energy saving features to reduce network energy consumption and increase network efficiency. In particular, the energy consumption of a network entity 105 (e.g., a base station) may be reduced. For example, a relative energy consumption for downlink and uplink transmissions (e.g., including power amplifier efficiency, quantities of transmit and receive antennas, network entity loads, and the like), sleep states and associated transition times, and reference parameters and configurations, among other factors, may be considered when reducing the energy consumption of the network entity 105.

In some examples, the network entity 105 may operate in different network energy saving modes (e.g., network energy saving states) to increase energy savings in the wireless communications system 100. The network entity 105 may configure a set of network energy saving modes, including a first network energy saving mode (e.g., NES1) and a second network energy saving mode (e.g., NES2), where a network energy saving mode may refer to a particular operation by the network entity 105 that saves energy. For example, the network entity 105 may operate using 64 antennas in the first network energy saving mode and 8 antennas in the second network energy saving mode, where using fewer antennas in the second network energy saving mode may reduce power consumption of the network entity 105. In addition, some network energy saving modes may be associated with normal network operations (e.g., without a focus on power savings). In some examples, the network entity 105 may utilize such network energy saving modes in a semi-static manner. That is, the network entity 105 may operate using flexible network energy saving modes, where the network entity 105 may dynamically switch between different network energy saving modes depending on current traffic conditions of the UE 115.

The network entity 105 may use such dynamic switching between network energy saving modes in applications where data arrival times may be accurately expected, or at least where a distribution of the data arrival times may be highly expected. Some applications, however, may be subject to jitter that makes data arrival times follow a normal distribution that may arrive slightly earlier or later than expected. For example, the arrival times of extended reality (XR) traffic may follow a Gaussian distribution. At an initial time corresponding to the beginning of the distribution, there may be a low probability that the UE 115 is to receive some XR data transmission. At a later time corresponding to the middle of the distribution, there may be a high probability that the UE 115 is to receive some XR data transmission. Accordingly, the network entity 105 may assign the UE 115 few monitoring occasions at the initial time where the UE 115 may receive few XR data transmissions, and many more monitoring occasions at the later time where the UE 115 may receive multiple XR data transmissions.

In some examples, the network entity 105 may transmit dynamic signaling, such as DCI, to the UE 115 configuring the UE 115 to use a particular CORESET configuration associated with one or more monitoring occasions. For example, if the network entity 105 expects high traffic loads at the UE 115, the network entity 105 may transmit DCI to the UE 115 configuring the UE 115 with a set of monitoring occasions. In this way, an amount of data scheduled to be received by the UE 115 (which may be modeled according to some distribution) may impact how many DCI transmissions the UE 115 receives from the network entity 105. If the traffic loads of the UE 115 change frequently, the network entity 105 may transmit many DCI transmissions to the UE 115, increasing overhead and power consumption at the UE 115.

The network entity 105 may predict the traffic loads of the UE 115 over time and use them to adapt the monitoring occasions of the UE 115 to improve UE power efficiency. For example, as the operations of the network entity 105 and the network energy saving modes depend on the data arrival times of UE traffic, the network energy saving modes and the distribution of the data arrival times is tightly related. However, the CORESET configurations and of the UE 115, which may include configurations of monitoring occasions, may be configured per BWP, instead of per network energy saving mode.

The wireless communications system 100 may support a linking between periodicities and distributions of monitoring occasions of the UE 115 with network energy saving modes, where the UE 115 may be configured with different CORESET and search space configurations per network energy saving mode. Such a linking may enable the UE 115 to use an efficient amount of monitoring occasions for a given network energy saving mode instead of per BWP, which may reduce overhead for the UE 115 and improve network energy efficiency.

The techniques described herein provide for linking control channel monitoring occasions with energy saving modes (also referred to as network energy saving modes) such that a UE 115 may implicitly switch from one monitoring occasion to another based on switching from one energy saving mode to another. A network entity 105 may configure the UE 115 with a set of energy saving modes, where each energy saving mode is associated with a monitoring occasion configuration. In some examples, a monitoring occasion configuration may include a CORESET configuration and a search space configuration. When the UE 115 switches between energy saving modes, the UE 115 may also implicitly switch between corresponding monitoring occasion configurations. That is, the network entity 105 may refrain from transmitting DCI or other dynamic signaling to the UE 115 each time the UE 115 is to switch from one energy saving mode to another, thereby reducing overhead for the UE 115 and improving energy and power efficiency of the wireless communications system 100. In some examples, the network entity 105 may configure the monitoring occasion configurations (including CORESET configurations and search space configurations) such that they are offset from a BWP configuration or based on a distribution across an active time of a given energy saving mode.

Figure 2:
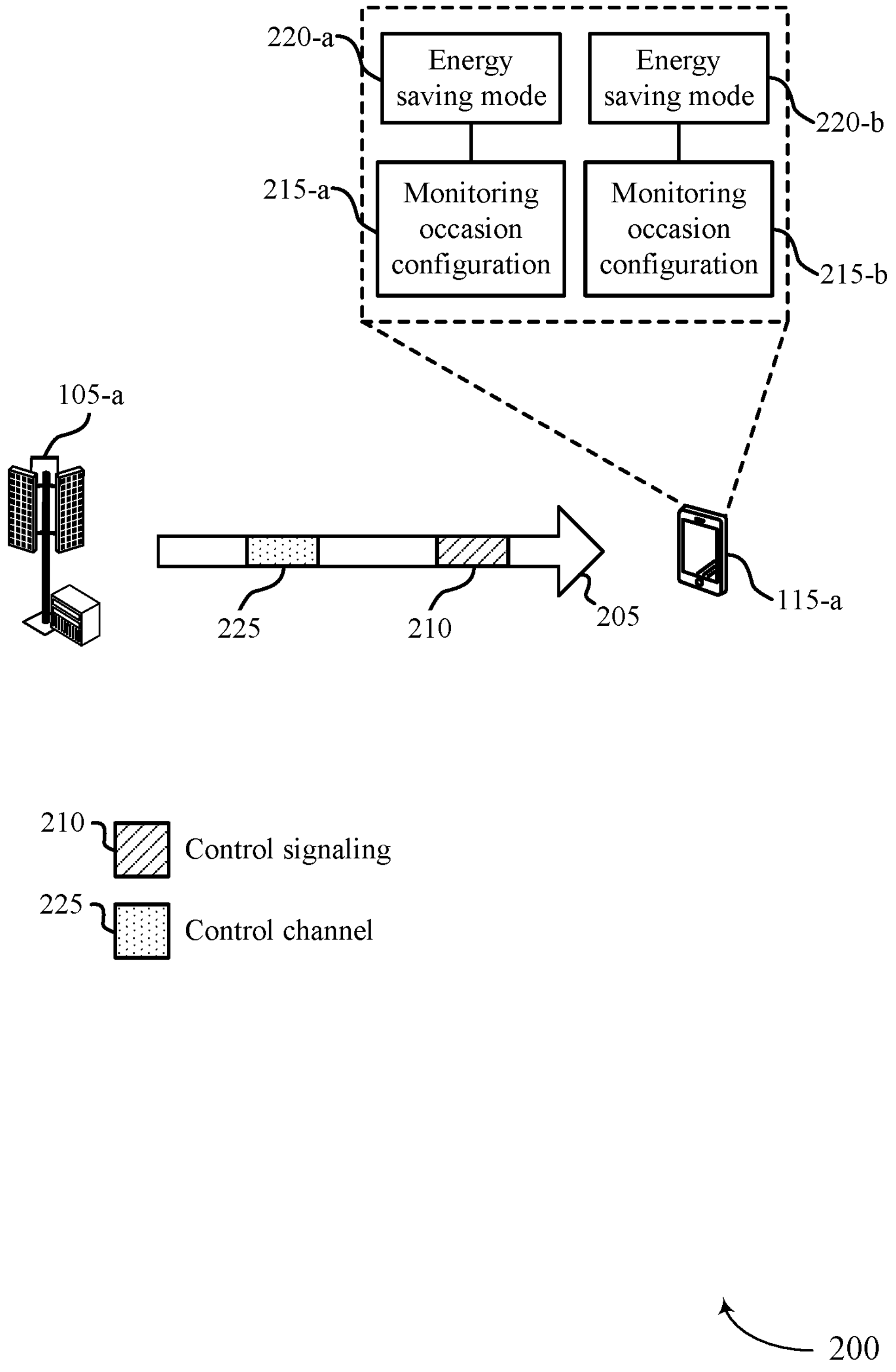
FIG. 2 illustrates an example of a wireless communications system that supports control channel monitoring adaptation under a sequence of network operations in accordance with one or more aspects of the present disclosure.

FIG. 2 illustrates an example of a wireless communications system 200 that supports control channel monitoring adaptation under a sequence of network operations in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-*a* and a network entity 105-*a*, which may be examples of corresponding devices as described herein. The UE 115-*a* and the network entity 105-*a* may support a set of energy saving modes 220 (which may also be referred to as a network energy saving modes or states) and a set of monitoring occasion configurations 215.

The wireless communications system 200 may support wireless communications between the network entity 105-*a* and the UE 115-*a*. For example, the network entity 105-*a* may communicate with the UE 115-*a* via a communications link 205, which may be an example of a communication link 125 described herein with reference to FIG. 1. In some examples, the network entity 105-*a* may configure the UE 115-*a* with a set of monitoring occasion configurations 215, where each monitoring occasion configuration 215 may be linked to an energy saving mode 220. For example, the UE 115-*a* may receive control signaling 210 from the network entity 105-*a* indicating the set of monitoring occasion configurations 215, where a monitoring occasion configuration 215-*a* (e.g., a first monitoring occasion configuration) may correspond to (e.g., be linked to) an energy saving mode 220-*a* (e.g., a first energy saving mode) of the set of energy saving modes 220. In addition, a monitoring occasion configuration 215-*b* (e.g., a second monitoring occasion configuration) may correspond to an energy saving mode 220-*b* (e.g., a second energy saving mode).

In some examples, each monitoring occasion configuration 215 may include a CORESET configuration and a search space configuration such that each energy saving mode 220 also corresponds to a CORESET configuration and a search space configuration. In addition, the CORESET configurations and the search space configurations may overwrite existing BWP configurations for the UE 115-*a*. In some cases, the control signaling 210 may indicate a set of CORESET configurations and a set of search space configurations, where a first CORESET configuration and a first search space configuration are associated with the energy saving mode 220-*a*, and where the monitoring occasion configuration 215 includes the first CORESET and search space configurations.

The UE 115-*a* may operate using the energy saving mode 220-*a* for a given period of time. For example, the UE 115-*a* may use the energy saving mode 220-*a* while particular traffic loads are scheduled for transmission to the UE 115-*a*. By operating in the energy saving mode 220-*a* (or any energy saving mode 220), the UE 115-*a* may use specific operations that save energy. For example, the UE 115-*a* may use a limited quantity of antennas, or reduce or completely shut off other operations to reduce power consumption. In some cases, the UE 115-*a* may switch from the energy saving mode 220-*a* to the energy saving mode 220-*b*. For example, the UE 115-*a* may switch to the energy saving mode 220-*b* based on a change in expected traffic conditions for the UE 115-*a*, and without any signaling from the network entity 105-*a*.

In some cases, based on switching from the energy saving mode 220-*a* to the energy saving mode 220-*b*, the UE 115-*a* may switch from the monitoring occasion configuration 215-*a* corresponding to the energy saving mode 220-*a* to the monitoring occasion configuration 215-*b* corresponding to the energy saving mode 220-*b*. That is, because the monitoring occasion configurations 215 are linked to the energy saving modes 220, the UE 115-*a* may implicitly switch between monitoring occasion configurations 215 based on switching energy saving modes 220. In some examples, the UE 115-*a* may monitor a control channel 225 (e.g., a physical downlink control channel (PDCCH)) in accordance with the monitoring occasion configuration 215-*b*.

As the UE 115-*a* may switch from the monitoring occasion configuration 215-*a* to the monitoring occasion configuration 215-*b*, the UE 115-*a* may switch between CORESET and search space configurations. For example, the UE 115-*a* may switch from the first CORESET configuration and the first search space configuration to a second CORESET configuration and a second search space configuration based on switching from the energy saving mode 220-*a* to the energy saving mode 220-*b*, where the monitoring occasion configuration 215-*b* may include the second CORESET and search space configurations.

Additionally, or alternatively, the UE 115-*a* may implicitly perform search space group switching by switching from one energy saving mode 220 to another. Such implicit search space group switching may be based on a given energy saving mode 220 being linked with one or more corresponding search space groups. In this way, the UE 115-*a* may switch from a first search space group associated with the monitoring occasion configuration 215-*a* to a second search space group associated with the monitoring occasion configuration 215-*b* based on switching from the energy saving mode 220-*a* to the energy saving mode 220-*b*. The UE 115-*a* may monitor the control channel 225 in accordance with the second search space group. For example, the UE 115-*a* may monitor a second search space group for a PDSCH transmitted by the network entity 105-*a*.

The network entity 105-*a* may derive the CORESET and search space configurations corresponding to the monitoring occasion configurations 215 from a BWP configuration by applying particular offsets as well as a quantity of symbols in each CORESET for each energy saving mode 220. In some cases, the control signaling 210 may indicate one or more offsets, which may include a time offset, a frequency offset, a periodicity offset, or any combination thereof. The network entity 105-*a* may derive the monitoring occasion configuration 215-*b* based on applying at least one of the offsets to a BWP configuration of the UE 115-*a*. That is, instead of deriving standalone CORESET and search space configurations for each energy saving mode 220, the network entity 105-*a* may utilize existing BWP configurations. For example, the network entity 105-*a* may derive a search space periodicity corresponding to the energy saving mode 220-*a* from an underlying BWP configuration and a periodicity offset configured (e.g., via an RRC configuration) specifically for the energy saving mode 220-*a*. In such examples, the control signaling 210 may indicate a periodicity of the monitoring occasion configuration 215-*b*, the periodicity based on the BWP configuration and the periodicity offset.

Implicitly switching monitoring occasion configurations 215 based on switching energy saving modes 220 may reduce overhead of the UE 115-*a* and improve network energy efficiency as monitoring occasions for the UE 115-*a* are configured per energy saving mode 220 instead of per BWP. For example, the UE 115-*a* may operate in the energy saving mode 220-*a* if small amounts of data (e.g., low traffic loads) are scheduled for transmission to the UE 115-*a*. Instead of transmitting DCI to the UE 115-*a* configuring the UE 115-*a* with a particular quantity of monitoring occasions during which the UE 115-*a* may monitor for the data, the UE 115-*a* may implicitly use the monitoring occasion configuration 215-*a* based on using the energy saving mode 220-*a*. This may result in reduced signaling overhead as the network entity 105-*a* may refrain from transmitting DCI or other dynamic signaling to the UE 115-*a*, as well as increased efficiency as the UE 115-*a* may adapt its monitoring behavior based on energy saving modes 220.

Figure 3:
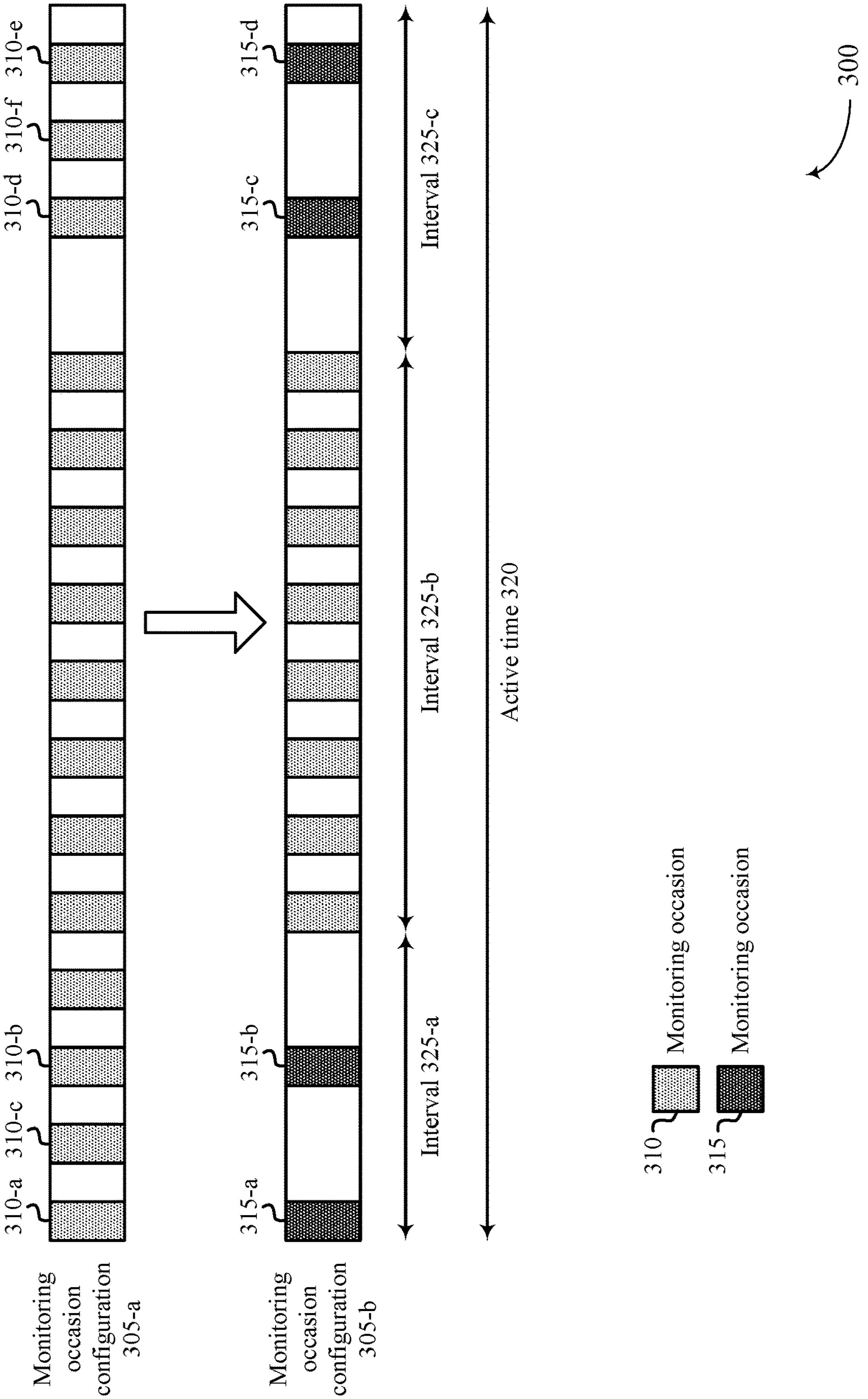
FIG. 3 illustrates an example of a monitoring configuration that supports control channel monitoring adaptation under a sequence of network operations in accordance with one or more aspects of the present disclosure.

FIG. 3 illustrates an example of a monitoring configuration 300 that supports control channel monitoring adaptation under a sequence of network operations in accordance with one or more aspects of the present disclosure. In some examples, the monitoring configuration 300 may implement aspects of the wireless communications systems 100 and 200 or may be implemented by aspects of the wireless communications systems 100 and 200. For example, a network entity may configure the monitoring configuration 300 for a UE based on one or more energy saving modes. The monitoring configuration 300 may include a monitoring occasion configuration 305-*a*, based on a BWP configuration, and a monitoring occasion configuration 305-*b*, based on an energy saving mode.

In some examples, the network entity (e.g., a network entity 105 as described herein) may configure the UE (e.g., a UE 115 as described herein) with the monitoring occasion configuration 305-*a* according to BWP configurations of the UE. For example, regardless of a current energy saving mode, the UE may use the monitoring occasion configuration 305-*a* to monitor a control channel for DCI from the network entity. The monitoring occasion configuration 305-*a* may include some quantity of monitoring occasions 310 based on the BWP configuration. However, the monitoring occasion configuration 305-*a* may limit the UE from using more or fewer monitoring occasions based on traffic scheduled for transmission to the UE, or based on behaviors of the network entity. For example, instead of a frequency of the monitoring occasions 310 being based on an energy saving mode, the monitoring occasions 310 may be configured based on BWPs.

Alternatively, the network entity may configure the monitoring occasion configuration 305-*b* according to an active energy saving mode. As described herein with reference to FIG. 2, the network entity may transmit control signaling to the UE. The control signaling may indicate a set of monitoring occasion configurations that is linked to a set of energy saving modes in which the UE may operate. For example, the monitoring occasion configuration 305-*b* may correspond to a first energy saving mode. In some cases, the monitoring occasion configuration 305-*b* may correspond to a first CORESET configuration and a first search space configuration, according to which the UE may monitor for downlink transmissions from the network entity.

In some examples, monitoring occasions 310 and monitoring occasions 315 (e.g., PDCCH monitoring occasions) of the monitoring occasion configuration 305-*b* may be in the form of a distribution across the active time 320 of a given energy saving mode, where each energy saving mode may have its own distribution. The network entity may transmit the control signaling to the UE indicating the distribution associated with the monitoring occasion configuration 305-*b*, the distribution indicating a set of intervals across the active time 320 of a corresponding energy saving mode, where an interval 325 (e.g., a sub-interval) of the set of intervals includes one or more monitoring occasions 310, monitoring occasions 315, or both.

If the UE is expecting, within the active time 320 of a given energy saving mode, that the arrival times of a set of data follows some distribution (e.g., a Gaussian distribution), then the monitoring occasions during that energy saving mode may have a distribution that matches that of the arrival times. To configure the distribution of the monitoring occasion configuration 305-*b* such that it matches the distribution of the arrival times of the data, the network entity may configure a set of intervals (e.g., sub-intervals) of the active time 320 if the energy saving mode. The set of intervals may include an interval 325-*a* (e.g., sub-interval 1), an interval 325-*b* (e.g., sub-interval 2), and an interval 325-*c* (e.g., sub-interval 3).

The network entity may configure the monitoring occasion configuration 305-*b* based on the monitoring occasion configuration 305-*a*. For example, the monitoring occasion configuration 305-*b* may be based on the BWP configuration of the monitoring occasion configuration 305-*b*, where the network entity may configure the monitoring occasions 310 included in the interval 325-*b* according to the BWP configuration. In the interval 325-*a* and the interval 325-*c*, the network entity may configure (e.g., via an RRC configuration) the monitoring occasions 315 following a different distribution than the monitoring occasions 310 of the monitoring occasion configuration 305-*a*. That is, the distribution of the monitoring occasion configuration 305-*b* during the interval 325-*a* and the interval 325-*c* may be defined by different sub-sampling and muting of monitoring occasions 315.

For example, the monitoring occasion configuration 305-*a* may include a monitoring occasion 310-*a*, a monitoring occasion 310-*b*, and a monitoring occasion 310-*c* in the interval 325-*a*. The monitoring occasion configuration 305-*b* may include a monitoring occasion 315-*a* corresponding to the monitoring occasion 310-*a*, and a monitoring occasion 315-*b* corresponding to the monitoring occasion 310-*b*. However, the monitoring occasion 310-*c* of the monitoring occasion configuration 305-*a* may be skipped in the monitoring occasion configuration 305-*b*. In another example, the monitoring occasion configuration 305-*a* may include a monitoring occasion 310-*d*, a monitoring occasion 310-*e*, and a monitoring occasion 310-*f* in the interval 325-*c*. The monitoring occasion configuration 305-*b* may include a monitoring occasion 315-*c* corresponding to the monitoring occasion 310-*d*, and a monitoring occasion 315-*d* corresponding to the monitoring occasion 310-*e*. However, the monitoring occasion 310-*f* of the monitoring occasion configuration 305-*a* may be skipped in the monitoring occasion configuration 305-*b*. As such, the monitoring occasion configuration 305-*b* may use a sub-sampling of two monitoring occasions 310 or a muting of monitoring occasions 310 with respect to the monitoring occasion configuration 305-*a*.

In this way, the distribution of the monitoring occasion configuration 305-*b* may be such that the interval 325-*a* includes relatively few monitoring occasions 315, the interval 325-*b* includes many monitoring occasions 310, and the interval 325-*c* includes relatively few monitoring occasions 315, which mimics a Gaussian distribution corresponding to the distribution of the arrival times of data. It should be noted that the network entity may configure the monitoring occasion configuration 305-*b* to follow any distribution with any quantity of intervals 325 of given lengths.

Figure 4:
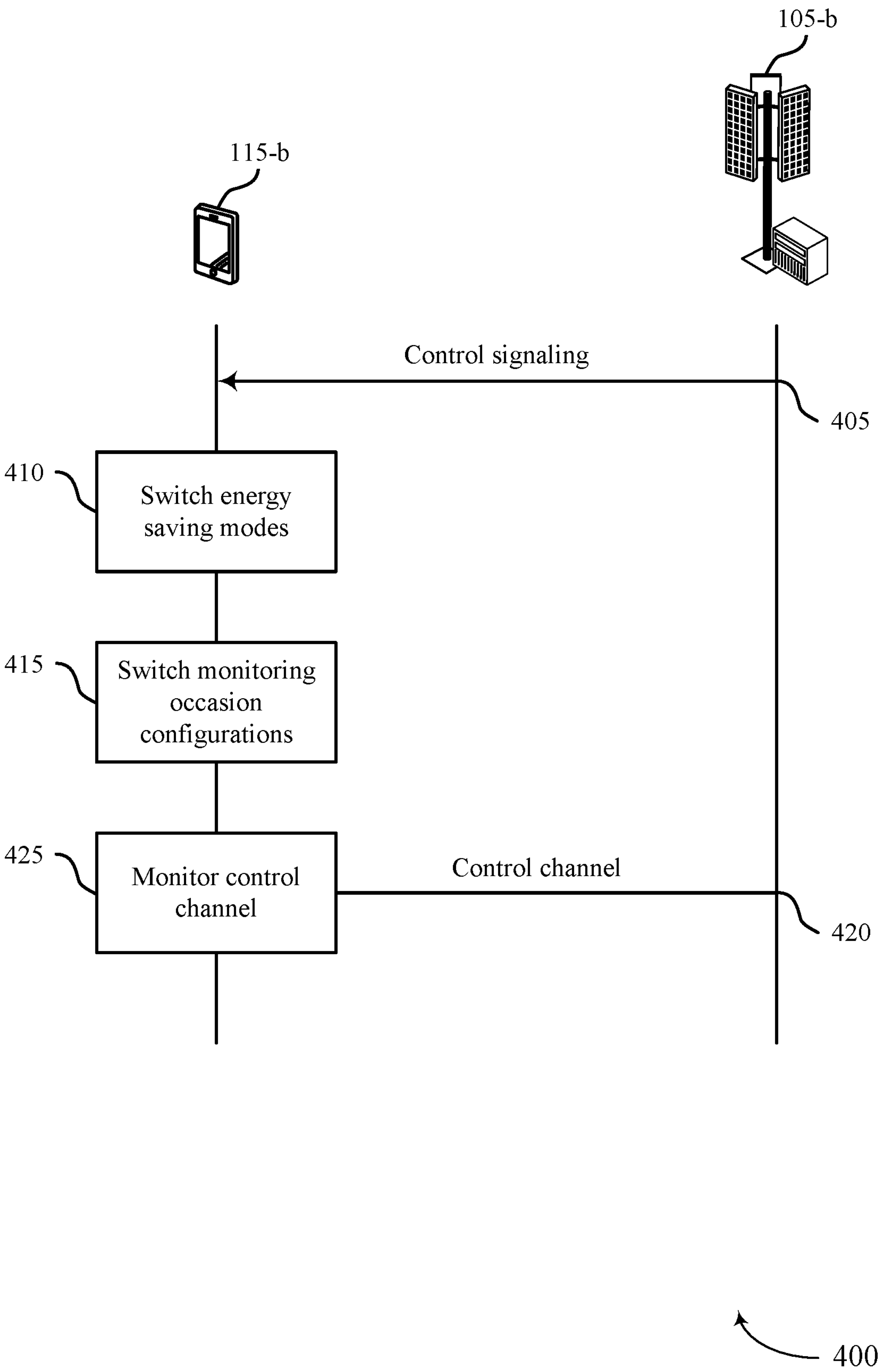
FIG. 4 illustrates an example of a process flow that supports control channel monitoring adaptation under a sequence of network operations in accordance with one or more aspects of the present disclosure.

FIG. 4 illustrates an example of a process flow 400 that supports control channel monitoring adaptation under a sequence of network operations in accordance with one or more aspects of the present disclosure. The process flow 400 may implement aspects of wireless communications systems 100 and 200, or may be implemented by aspects of the wireless communications system 100 and 200. For example, the process flow 400 may illustrate operations between a UE 115-*b* and a network entity 105-*b*, which may be examples of corresponding devices described herein. In the following description of the process flow 400, the operations between the UE 115-*b* and the network entity 105-*b* may be transmitted in a different order than the example order shown, or the operations performed by the UE 115-*b* and the network entity 105-*b* may be performed in different orders or at different times. Some operations may also be omitted from the process flow 400, and other operations may be added to the process flow 400.

At 405, the UE 115-*b* may receive, from the network entity 105-*b*, control signaling indicating a set of monitoring occasion configurations, where a first monitoring occasion configuration corresponds to a first energy saving mode of a set of energy saving modes. That is, each monitoring occasion configuration may correspond to (e.g., be linked to) an energy saving mode. In some cases, each monitoring occasion configuration may correspond to a CORESET configuration and a search space set configuration. In this way, each CORESET and search space configuration may correspond to an energy saving mode.

At 410, the UE 115-*b* may switch from the first energy saving mode to a second energy saving mode. For example, the UE 115-*b* may switch to the second energy saving mode based on an increase or decrease in traffic scheduled for transmission to the UE 115-*b*. While operating in a given energy saving mode, the UE 115-*b* may save power by limiting at least some functionalities of the UE 115-*b* (e.g., shutting off one or more antennas, using lower transmit and receive powers, and the like).

At 415, the UE 115-*b* may switch from the first monitoring occasion configuration corresponding to the first energy saving mode to a second monitoring occasion configuration corresponding to the second energy saving mode based on switching from the first energy saving mode to the second energy saving mode. Because the energy saving modes and the monitoring occasion configurations are linked (as indicated in the control signaling), the UE 115-*b* may implicitly switch monitoring occasion configurations based on switching energy saving modes.

At 420, the network entity 105-*b* may transmit, to the UE 115-*b*, a control channel (e.g., a PDCCH) in accordance with the second monitoring occasion configuration. At 425, the UE 115-*b* may monitor the control channel in accordance with the second monitoring occasion configuration. In some examples, the UE 115-*b* may monitor the control channel in one or more monitoring occasions or search spaces according to the second monitoring occasion configuration (or a corresponding search space group). In some cases, the monitoring occasions in which the UE 115-*b* monitors the control channel may be configured based on a distribution over one or more intervals of an active time of the second energy saving mode.

Figure 5:
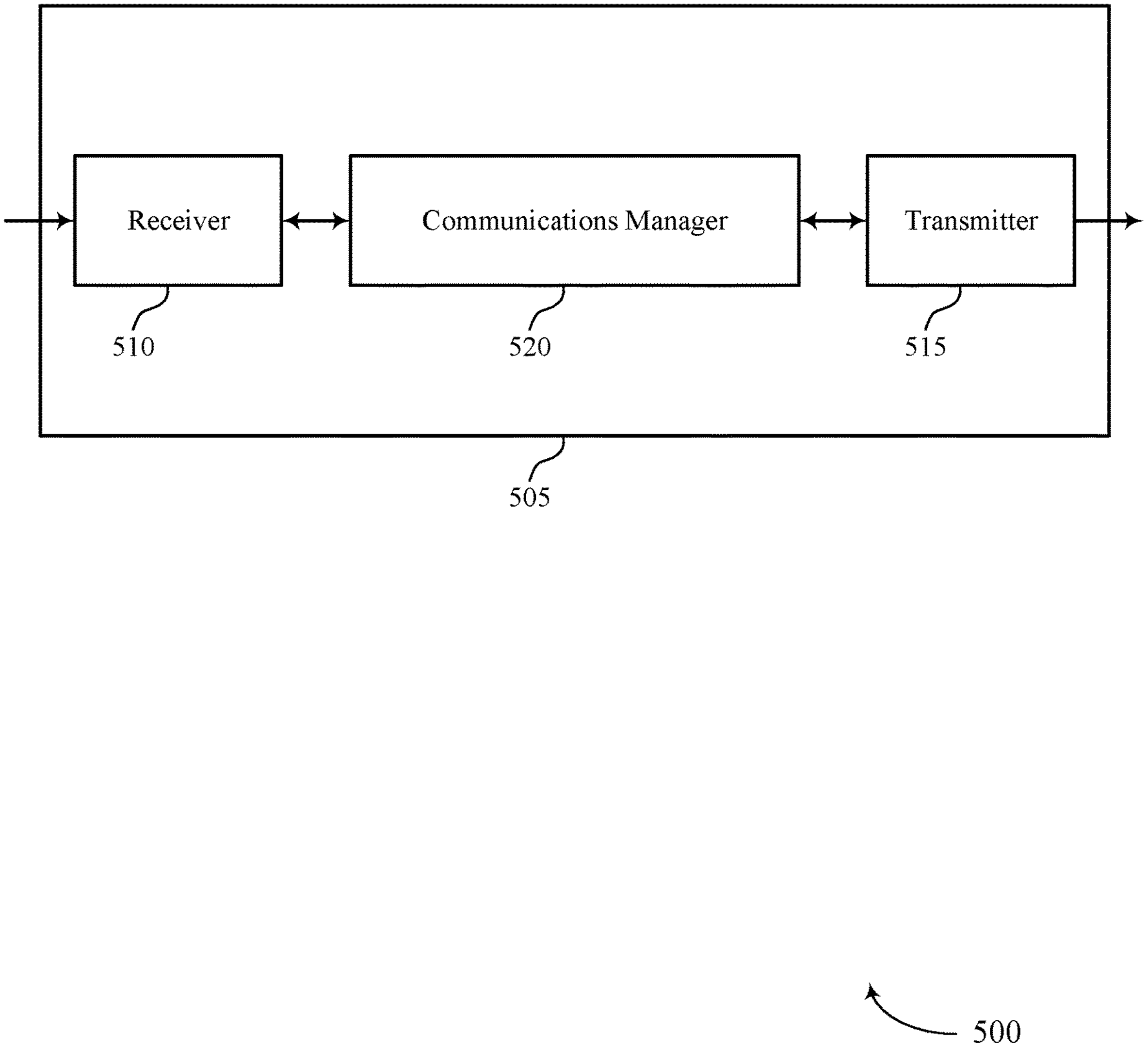
FIGS. 5 and 6 show block diagrams of devices that support control channel monitoring adaptation under a sequence of network operations in accordance with one or more aspects of the present disclosure.

FIG. 5 shows a block diagram 500 of a device 505 that supports control channel monitoring adaptation under a sequence of network operations in accordance with one or more aspects of the present disclosure. The device 505 may be an example of aspects of a UE 115 as described herein. The device 505 may include a receiver 510, a transmitter 515, and a communications manager 520. The device 505 may also include a processor (not shown). Each of these components may be in communication with one another (e.g., via one or more buses).

The receiver 510 may provide a means for receiving information such as packets, user data, control information, or any combination thereof associated with various information channels (e.g., control channels, data channels, information channels related to control channel monitoring adaptation under a sequence of network operations). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to control channel monitoring adaptation under a sequence of network operations). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of control channel monitoring adaptation under a sequence of network operations as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving control signaling indicating a set of monitoring occasion configurations, wherein a first monitoring occasion configuration corresponds to a first energy saving mode of a set of energy saving modes. The communications manager 520 may be configured as or otherwise support a means for switching from the first energy saving mode to a second energy saving mode. The communications manager 520 may be configured as or otherwise support a means for switching from the first monitoring occasion configuration corresponding to the first energy saving mode to a second monitoring occasion configuration corresponding to the second energy saving mode based at least in part on switching from the first energy saving mode to the second energy saving mode. The communications manager 520 may be configured as or otherwise support a means for monitoring a control channel in accordance with the second monitoring occasion configuration.

By including or configuring the communications manager 520 in accordance with examples as described herein, the device 505 (e.g., a processor controlling or otherwise coupled with the receiver 510, the transmitter 515, the communications manager 520, or any combination thereof) may support techniques for linking monitoring occasion configurations and energy saving modes such that a UE may switch monitoring occasion configurations based at least in part on switching energy saving modes, which may reduce UE overhead, improve network energy efficiency, and increase power savings.

Figure 6:
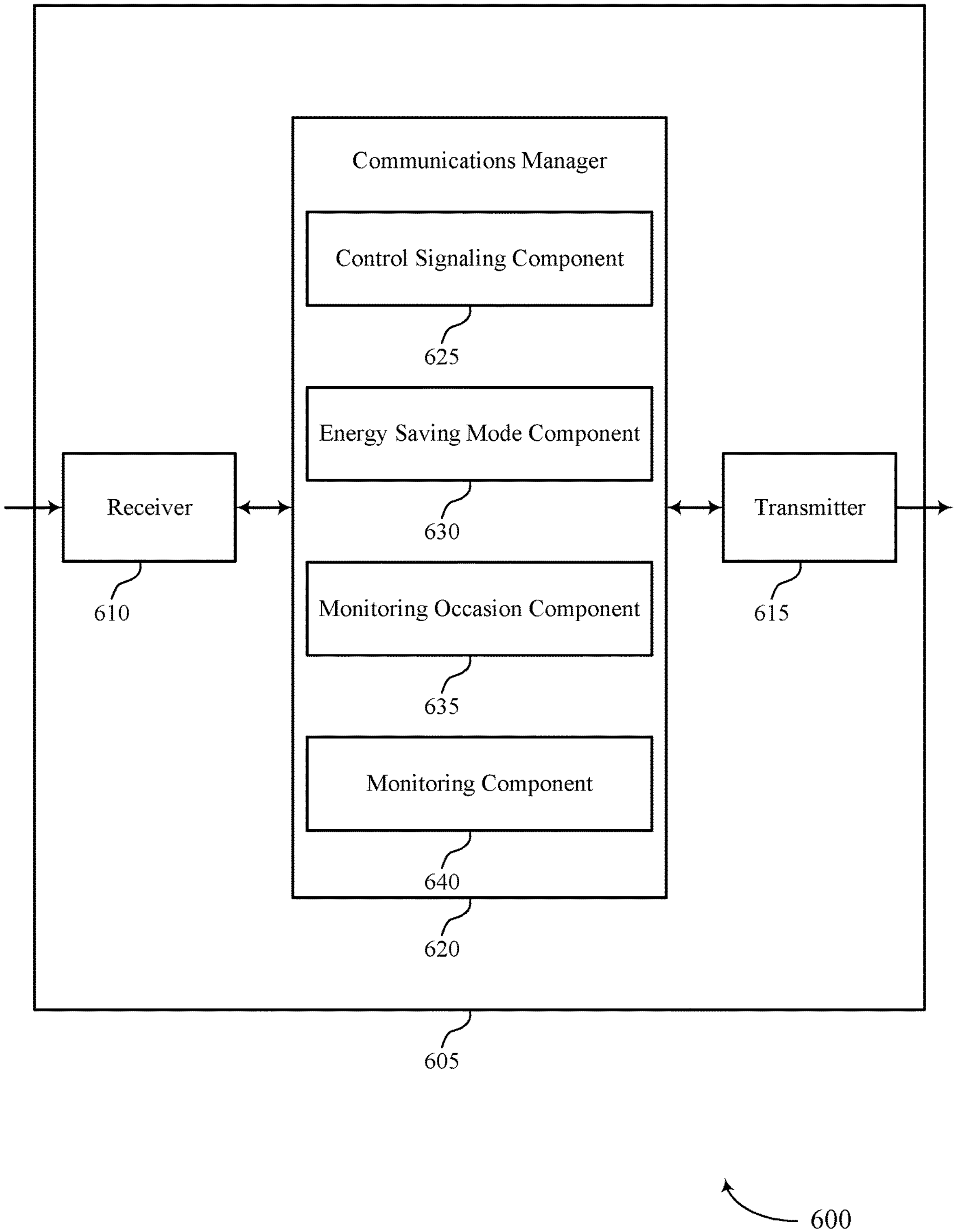

FIG. 6 shows a block diagram 600 of a device 605 that supports control channel monitoring adaptation under a sequence of network operations in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor (not shown). Each of these components may be in communication with one another (e.g., via one or more buses).

The receiver 610 may provide a means for receiving information such as packets, user data, control information, or any combination thereof associated with various information channels (e.g., control channels, data channels, information channels related to control channel monitoring adaptation under a sequence of network operations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to control channel monitoring adaptation under a sequence of network operations). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of control channel monitoring adaptation under a sequence of network operations as described herein. For example, the communications manager 620 may include a control signaling component 625, an energy saving mode component 630, a monitoring occasion component 635, a monitoring component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The control signaling component 625 may be configured as or otherwise support a means for receiving control signaling indicating a set of monitoring occasion configurations, wherein a first monitoring occasion configuration corresponds to a first energy saving mode of a set of energy saving modes. The energy saving mode component 630 may be configured as or otherwise support a means for switching from the first energy saving mode to a second energy saving mode. The monitoring occasion component 635 may be configured as or otherwise support a means for switching from the first monitoring occasion configuration corresponding to the first energy saving mode to a second monitoring occasion configuration corresponding to the second energy saving mode based at least in part on switching from the first energy saving mode to the second energy saving mode. The monitoring component 640 may be configured as or otherwise support a means for monitoring a control channel in accordance with the second monitoring occasion configuration.

Figure 7:
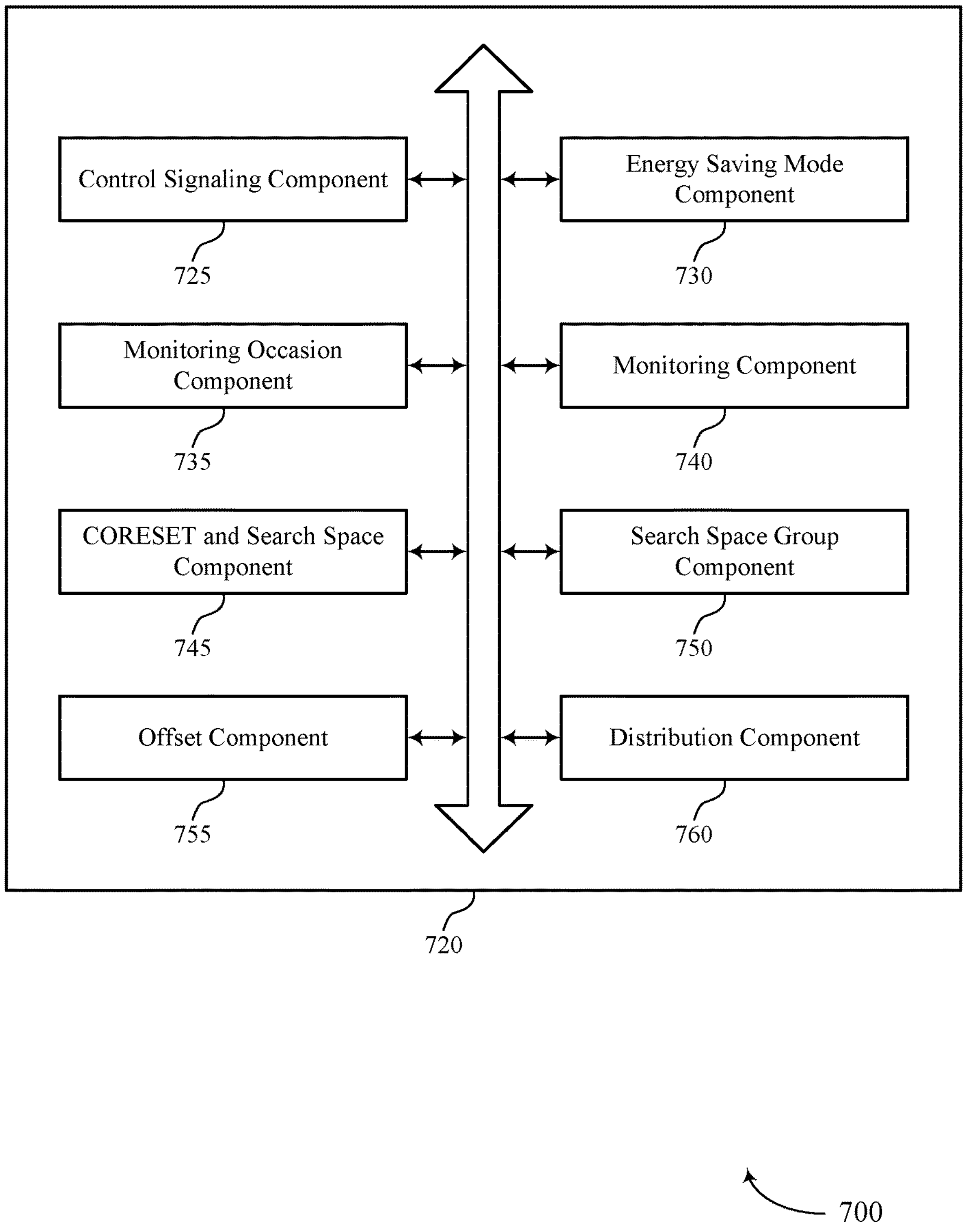
FIG. 7 shows a block diagram of a communications manager that supports control channel monitoring adaptation under a sequence of network operations in accordance with one or more aspects of the present disclosure.

FIG. 7 shows a block diagram 700 of a communications manager 720 that supports control channel monitoring adaptation under a sequence of network operations in accordance with one or more aspects of the present disclosure. The communications manager 720 may be an example of aspects of a communications manager 520, a communications manager 620, or both, as described herein. The communications manager 720, or various components thereof, may be an example of means for performing various aspects of control channel monitoring adaptation under a sequence of network operations as described herein. For example, the communications manager 720 may include a control signaling component 725, an energy saving mode component 730, a monitoring occasion component 735, a monitoring component 740, a CORESET and search space component 745, a search space group component 750, an offset component 755, a distribution component 760, or any combination thereof. Each of these components may communicate, directly or indirectly, with one another (e.g., via one or more buses).

The communications manager 720 may support wireless communication at a UE in accordance with examples as disclosed herein. The control signaling component 725 may be configured as or otherwise support a means for receiving control signaling indicating a set of monitoring occasion configurations, wherein a first monitoring occasion configuration corresponds to a first energy saving mode of a set of energy saving modes. The energy saving mode component 730 may be configured as or otherwise support a means for switching from the first energy saving mode to a second energy saving mode. The monitoring occasion component 735 may be configured as or otherwise support a means for switching from the first monitoring occasion configuration corresponding to the first energy saving mode to a second monitoring occasion configuration corresponding to the second energy saving mode based at least in part on switching from the first energy saving mode to the second energy saving mode. The monitoring component 740 may be configured as or otherwise support a means for monitoring a control channel in accordance with the second monitoring occasion configuration.

In some examples, to support receiving the control signaling, the CORESET and search space component 745 may be configured as or otherwise support a means for receiving the control signaling indicating a set of CORESET configurations and a set of search space configurations, wherein a first CORESET configuration and a first search space configuration are associated with the first energy saving mode, and wherein the first monitoring occasion configuration includes the first CORESET configuration and the first search space configuration.

In some examples, to support switching from the first monitoring occasion configuration to the second monitoring occasion configuration, the monitoring occasion component 735 may be configured as or otherwise support a means for switching from a first CORESET configuration and a first search space configuration to a second CORESET configuration and a second search space configuration associated with the second energy saving mode based at least in part on switching from the first energy saving mode to the second energy saving mode, wherein the second monitoring occasion configuration includes the second CORESET configuration and the second search space configuration.

In some examples, the search space group component 750 may be configured as or otherwise support a means for switching from a first search space group associated with the first monitoring occasion configuration to a second search space group associated with the second monitoring occasion configuration based at least in part on switching from the first energy saving mode to the second energy saving mode. In some examples, the search space group component 750 may be configured as or otherwise support a means for monitoring the control channel in accordance with the second search space group.

In some examples, to support receiving the control signaling, the offset component 755 may be configured as or otherwise support a means for receiving the control signaling indicating one or more offsets, wherein the second monitoring occasion configuration is based at least in part on at least one or the one or more offsets being applied to a BWP configuration. In some examples, the one or more offsets includes a time offset, a frequency offset, a periodicity offset, or any combination thereof.

In some examples, to support receiving the control signaling, the control signaling component 725 may be configured as or otherwise support a means for receiving the control signaling indicating a periodicity of the second monitoring occasion configuration, wherein the periodicity is based at least in part on a BWP configuration and a periodicity offset.

In some examples, to support receiving the control signaling, the distribution component 760 may be configured as or otherwise support a means for receiving the control signaling indicating a distribution associated with the second monitoring occasion configuration that indicates a set of intervals across an active time of the second energy saving mode, wherein an interval of the set of intervals includes one or more monitoring occasions. In some examples, the distribution is based at least in part on sub-sampling the one or more monitoring occasions, muting the one or more monitoring occasions, or both.

Figure 8:
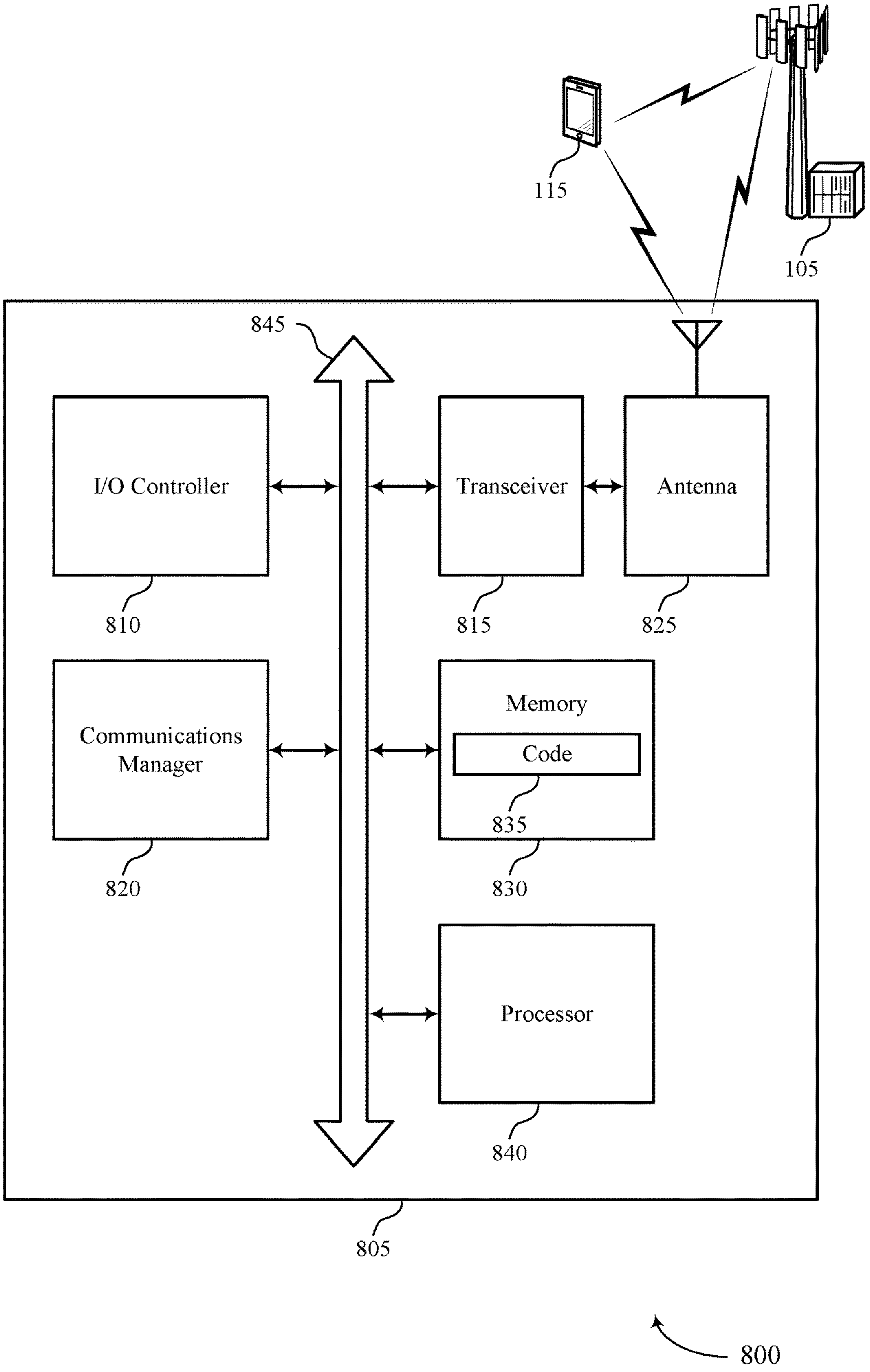
FIG. 8 shows a diagram of a system including a device that supports control channel monitoring adaptation under a sequence of network operations in accordance with one or more aspects of the present disclosure.

FIG. 8 shows a diagram of a system 800 including a device 805 that supports control channel monitoring adaptation under a sequence of network operations in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting control channel monitoring adaptation under a sequence of network operations). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving control signaling indicating a set of monitoring occasion configurations, wherein a first monitoring occasion configuration corresponds to a first energy saving mode of a set of energy saving modes. The communications manager 820 may be configured as or otherwise support a means for switching from the first energy saving mode to a second energy saving mode. The communications manager 820 may be configured as or otherwise support a means for switching from the first monitoring occasion configuration corresponding to the first energy saving mode to a second monitoring occasion configuration corresponding to the second energy saving mode based at least in part on switching from the first energy saving mode to the second energy saving mode. The communications manager 820 may be configured as or otherwise support a means for monitoring a control channel in accordance with the second monitoring occasion configuration.

By including or configuring the communications manager 820 in accordance with examples as described herein, the device 805 may support techniques for linking monitoring occasion configurations and energy saving modes such that a UE may switch monitoring occasion configurations based at least in part on switching energy saving modes, which may reduce UE overhead, improve network energy efficiency, and increase power savings.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described herein with reference to the communications manager 820 may be supported by or performed by the processor 840, the memory 830, the code 835, or any combination thereof. For example, the code 835 may include instructions executable by the processor 840 to cause the device 805 to perform various aspects of control channel monitoring adaptation under a sequence of network operations as described herein, or the processor 840 and the memory 830 may be otherwise configured to perform or support such operations.

Figure 9:
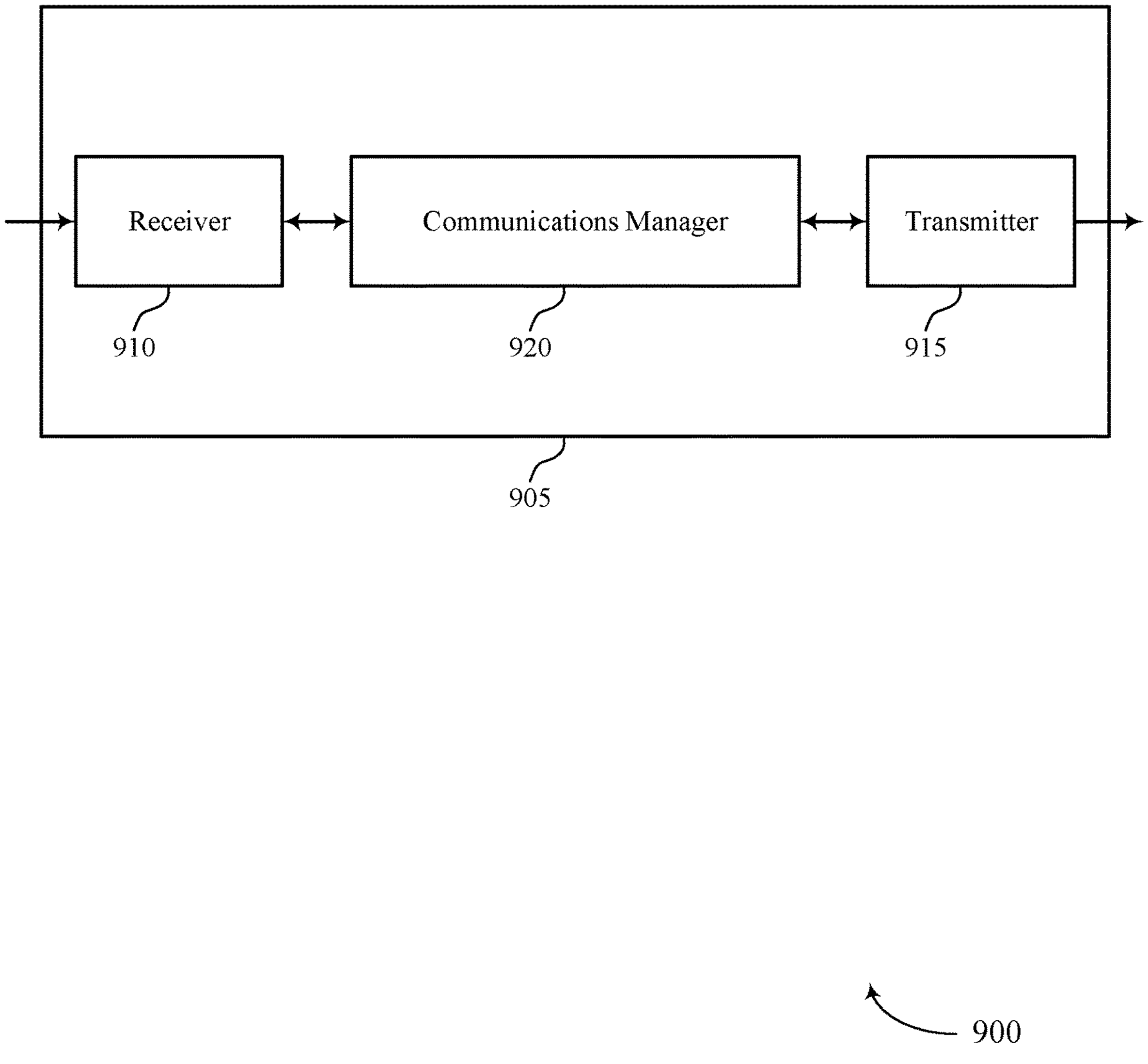
FIGS. 9 and 10 show block diagrams of devices that support control channel monitoring adaptation under a sequence of network operations in accordance with one or more aspects of the present disclosure.

FIG. 9 shows a block diagram 900 of a device 905 that supports control channel monitoring adaptation under a sequence of network operations in accordance with one or more aspects of the present disclosure. The device 905 may be an example of aspects of a network entity 105 as described herein. The device 905 may include a receiver 910, a transmitter 915, and a communications manager 920. The device 905 may also include a processor (not shown). Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of control channel monitoring adaptation under a sequence of network operations as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting control signaling indicating a set of monitoring occasion configurations, wherein a first monitoring occasion configuration is associated with a first energy saving mode of a set of energy saving modes, and wherein a second monitoring occasion configuration is associated with a second energy saving mode of the set of energy saving modes. The communications manager 920 may be configured as or otherwise support a means for transmitting a control channel in accordance with the second monitoring occasion configuration based at least in part on a UE switching from the first energy saving mode to the second energy saving mode.

By including or configuring the communications manager 920 in accordance with examples as described herein, the device 905 (e.g., a processor controlling or otherwise coupled with the receiver 910, the transmitter 915, the communications manager 920, or any combination thereof) may support techniques for linking monitoring occasion configurations and energy saving modes such that a UE may switch monitoring occasion configurations based at least in part on switching energy saving modes, which may reduce UE overhead, improve network energy efficiency, and increase power savings.

Figure 10:
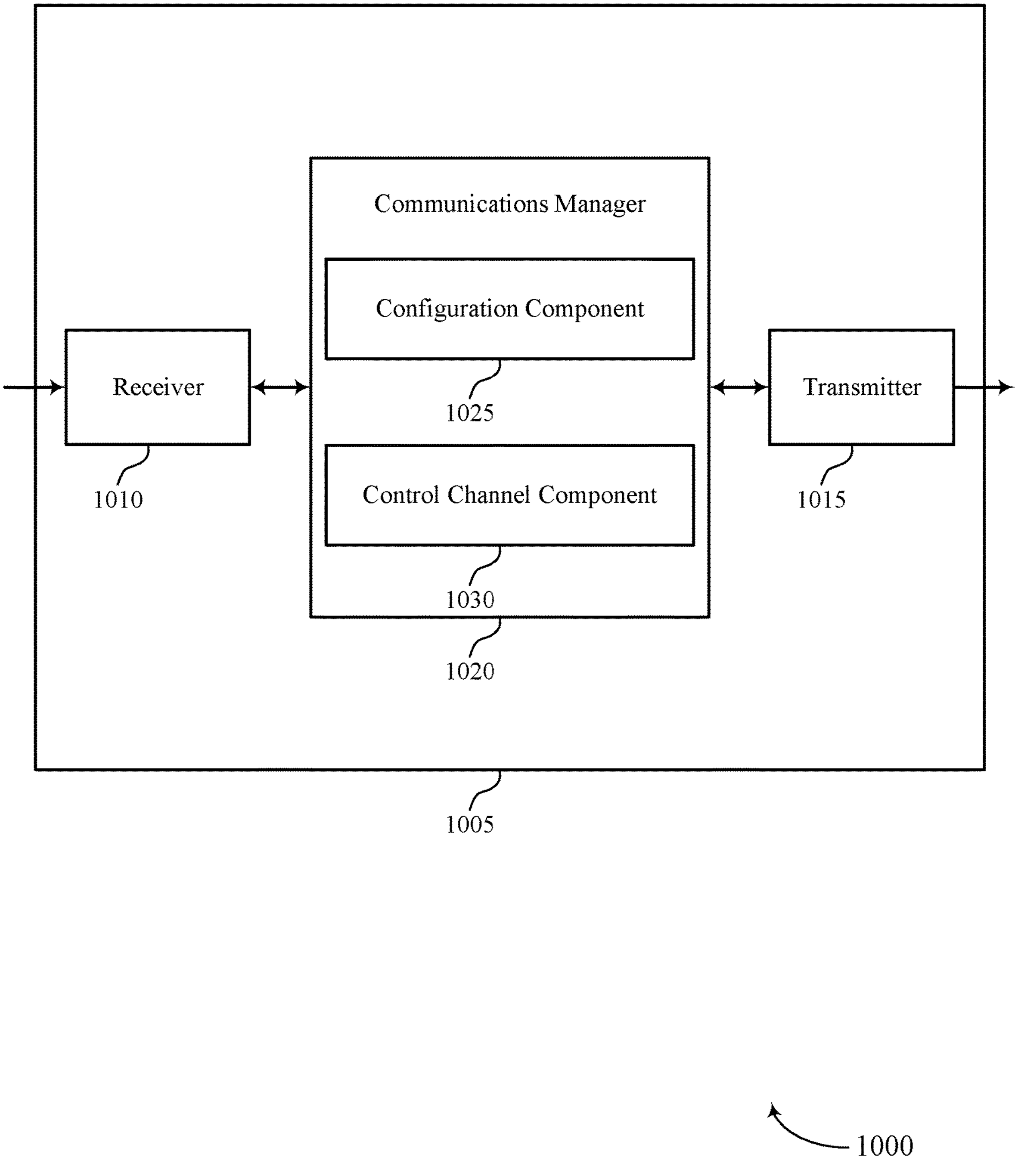

FIG. 10 shows a block diagram 1000 of a device 1005 that supports control channel monitoring adaptation under a sequence of network operations in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor (not shown). Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of control channel monitoring adaptation under a sequence of network operations as described herein. For example, the communications manager 1020 may include a configuration component 1025 a control channel component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The configuration component 1025 may be configured as or otherwise support a means for transmitting control signaling indicating a set of monitoring occasion configurations, wherein a first monitoring occasion configuration is associated with a first energy saving mode of a set of energy saving modes, and wherein a second monitoring occasion configuration is associated with a second energy saving mode of the set of energy saving modes. The control channel component 1030 may be configured as or otherwise support a means for transmitting a control channel in accordance with the second monitoring occasion configuration based at least in part on a UE switching from the first energy saving mode to the second energy saving mode.

Figure 11:
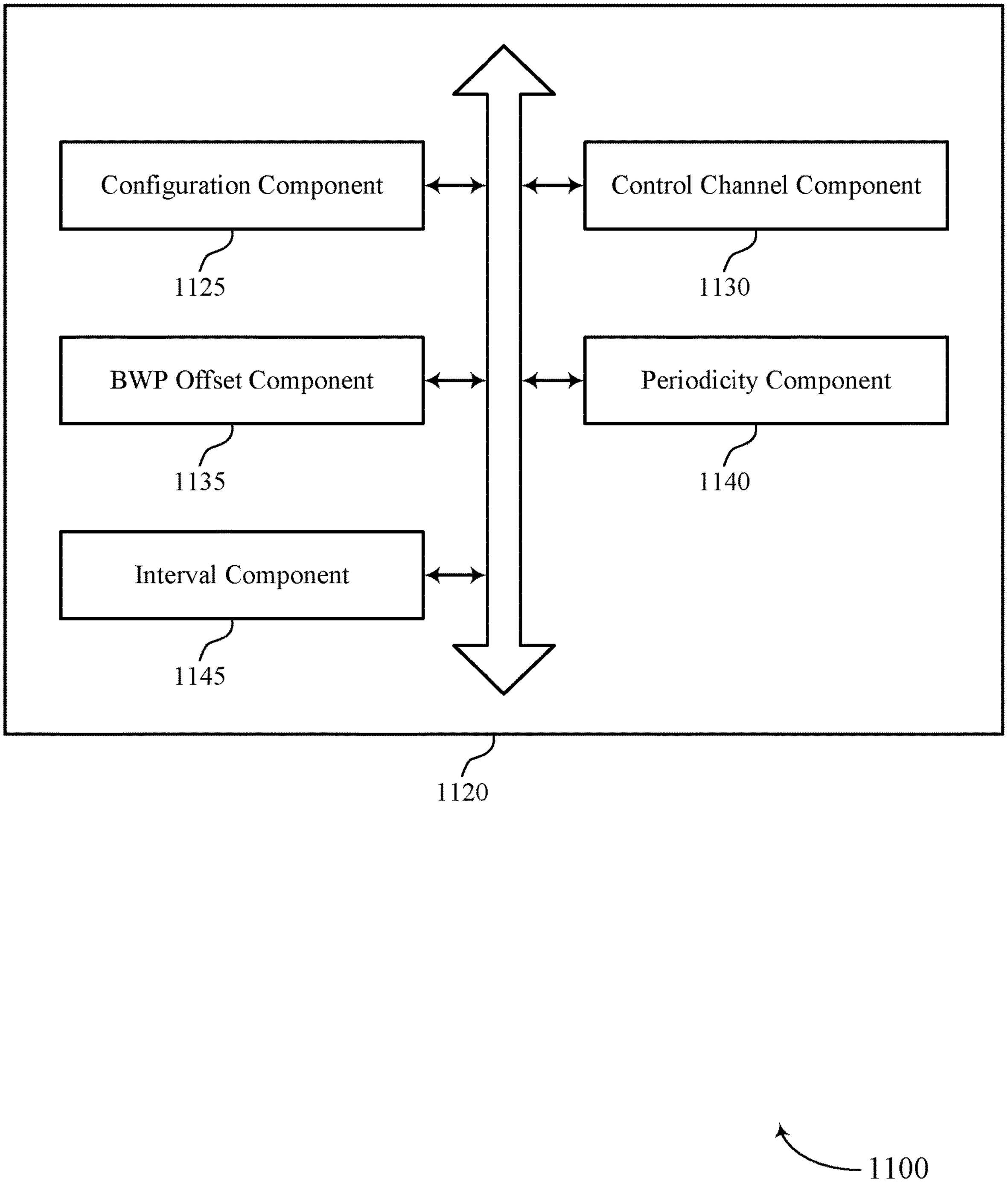
FIG. 11 shows a block diagram of a communications manager that supports control channel monitoring adaptation under a sequence of network operations in accordance with one or more aspects of the present disclosure.

FIG. 11 shows a block diagram 1100 of a communications manager 1120 that supports control channel monitoring adaptation under a sequence of network operations in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of control channel monitoring adaptation under a sequence of network operations as described herein. For example, the communications manager 1120 may include a configuration component 1125, a control channel component 1130, a BWP offset component 1135, a periodicity component 1140, an interval component 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The configuration component 1125 may be configured as or otherwise support a means for transmitting control signaling indicating a set of monitoring occasion configurations, wherein a first monitoring occasion configuration is associated with a first energy saving mode of a set of energy saving modes, and wherein a second monitoring occasion configuration is associated with a second energy saving mode of the set of energy saving modes. The control channel component 1130 may be configured as or otherwise support a means for transmitting a control channel in accordance with the second monitoring occasion configuration based at least in part on a UE switching from the first energy saving mode to the second energy saving mode.

In some examples, to support transmitting the control signaling, the configuration component 1125 may be configured as or otherwise support a means for transmitting the control signaling indicating a set of CORESET configurations and a set of search space configurations, wherein a first CORESET configuration and a first search space configuration are associated with the first energy saving mode, and wherein the first monitoring occasion configuration includes the first CORESET configuration and the first search space configuration.

In some examples, to support transmitting the control signaling, the BWP offset component 1135 may be configured as or otherwise support a means for transmitting the control signaling indicating one or more offsets, wherein the second monitoring occasion configuration is based at least in part on at least one or the one or more offsets being applied to a BWP configuration. In some examples, the one or more offsets includes a time offset, a frequency offset, a periodicity offset, or any combination thereof.

In some examples, to support transmitting the control signaling, the periodicity component 1140 may be configured as or otherwise support a means for transmitting the control signaling indicating a periodicity of the second monitoring occasion configuration, wherein the periodicity is based at least in part on a BWP configuration and a periodicity offset.

In some examples, to support transmitting the control signaling, the interval component 1145 may be configured as or otherwise support a means for transmitting the control signaling indicating a distribution associated with the second monitoring occasion configuration that indicates a set of intervals across an active time of the second energy saving mode, wherein an interval of the set of intervals includes one or more monitoring occasions. In some examples, the distribution is based at least in part on sub-sampling the one or more monitoring occasions, muting the one or more monitoring occasions, or both.

Figure 12:
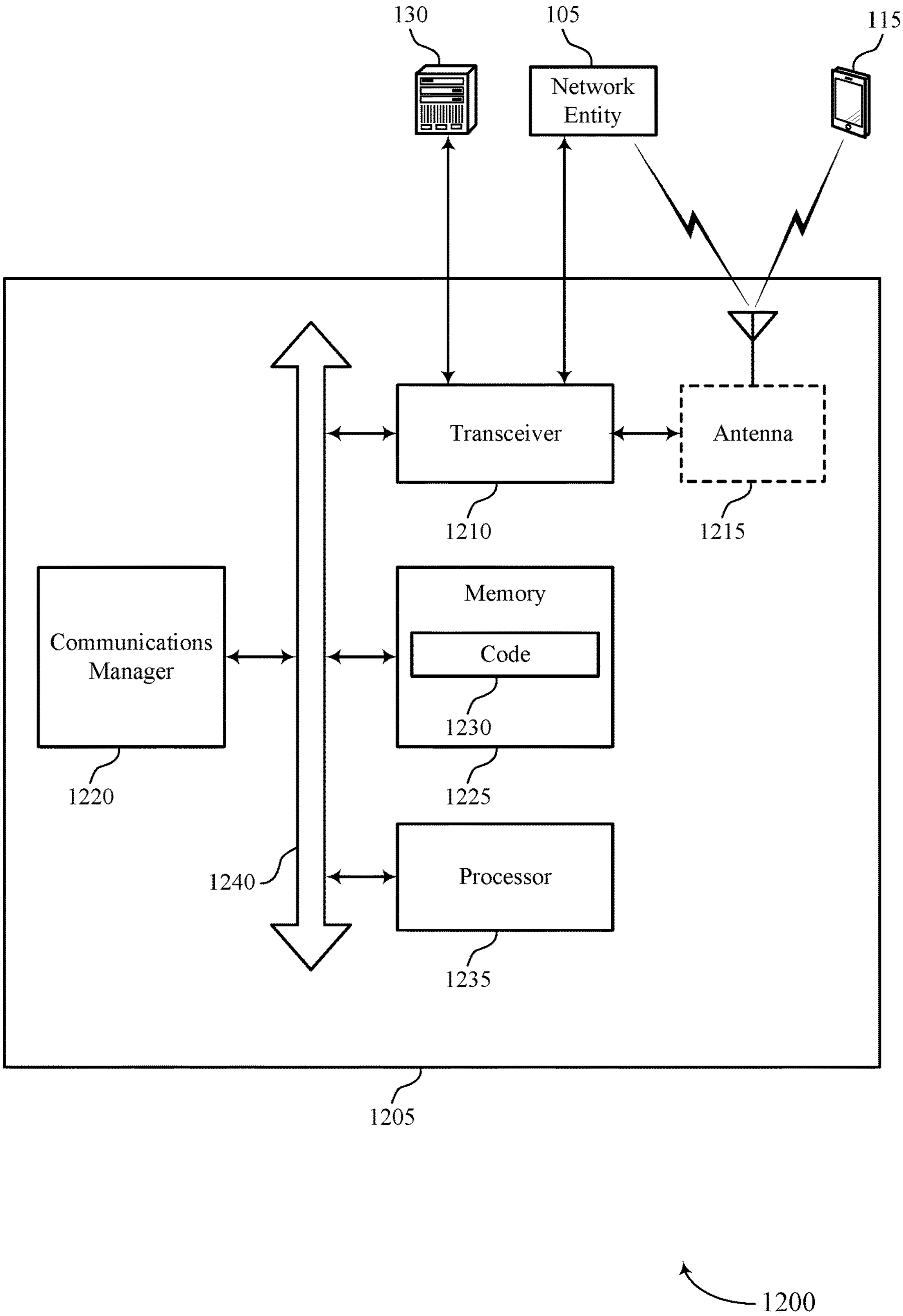
FIG. 12 shows a diagram of a system including a device that supports control channel monitoring adaptation under a sequence of network operations in accordance with one or more aspects of the present disclosure.

FIG. 12 shows a diagram of a system 1200 including a device 1205 that supports control channel monitoring adaptation under a sequence of network operations in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or any combination thereof. In some implementations, the transceiver 1210 may include or be configured for coupling with one or more processors or memory components that are operable to perform or support operations based at least in part on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting control channel monitoring adaptation under a sequence of network operations). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., wherein the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting control signaling indicating a set of monitoring occasion configurations, wherein a first monitoring occasion configuration is associated with a first energy saving mode of a set of energy saving modes, and wherein a second monitoring occasion configuration is associated with a second energy saving mode of the set of energy saving modes. The communications manager 1220 may be configured as or otherwise support a means for transmitting a control channel in accordance with the second monitoring occasion configuration based at least in part on a UE switching from the first energy saving mode to the second energy saving mode.

By including or configuring the communications manager 1220 in accordance with examples as described herein, the device 1205 may support techniques for linking monitoring occasion configurations and energy saving modes such that a UE may switch monitoring occasion configurations based at least in part on switching energy saving modes, which may reduce UE overhead, improve network energy efficiency, and increase power savings.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., wherein applicable), or any combination thereof. Although the communications manager 1220 is illustrated as a separate component, in some examples, one or more functions described herein with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of control channel monitoring adaptation under a sequence of network operations as described herein, or the processor 1235 and the memory 1225 may be otherwise configured to perform or support such operations.

Figure 13:
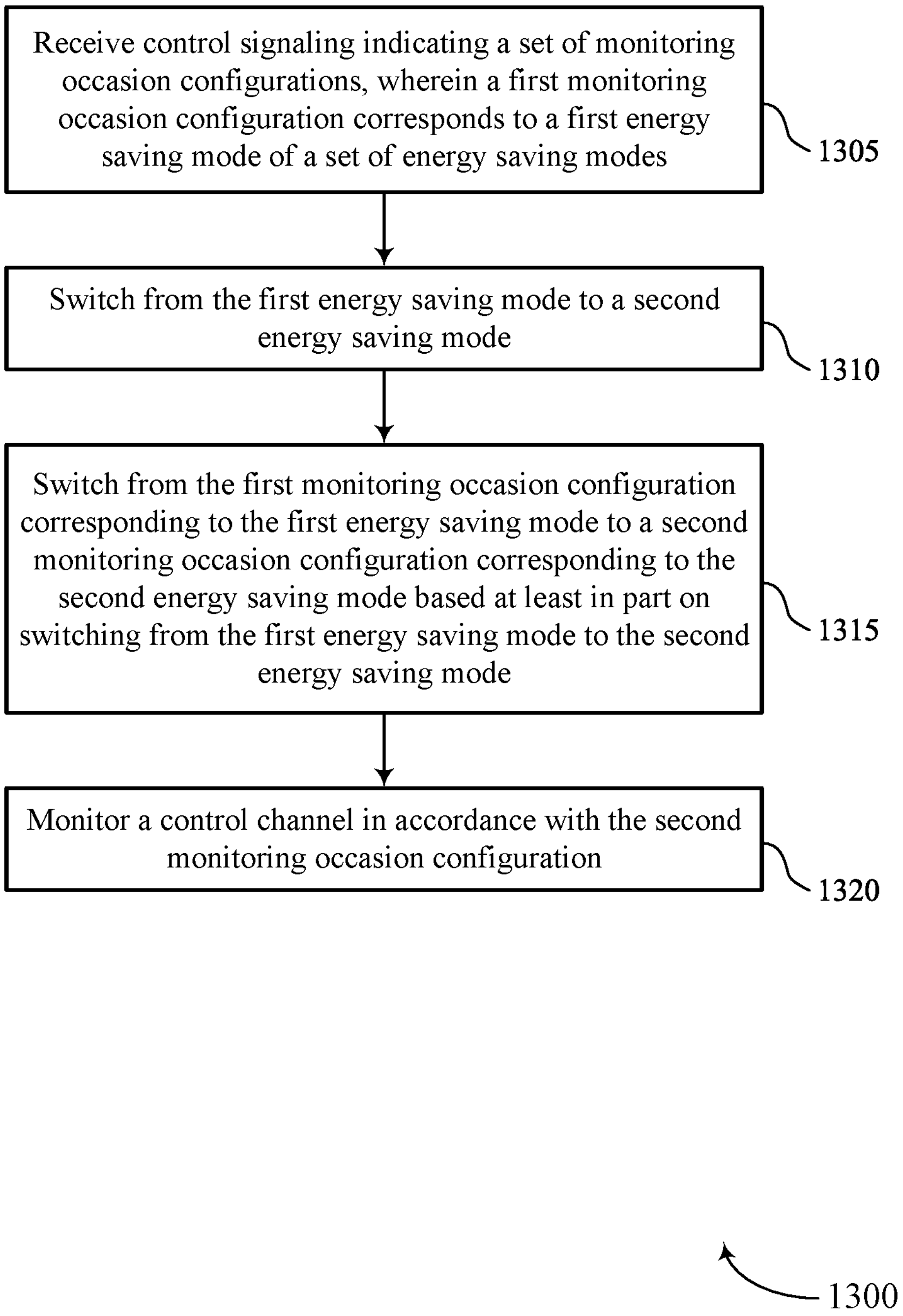

FIG. 13 shows a flowchart illustrating a method 1300 that supports control channel monitoring adaptation under a sequence of network operations in accordance with one or more aspects of the present disclosure. The operations of the method 1300 may be implemented by a UE or its components as described herein. For example, the operations of the method 1300 may be performed by a UE 115 as described herein with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may comprise receiving control signaling indicating a set of monitoring occasion configurations, wherein a first monitoring occasion configuration corresponds to a first energy saving mode of a set of energy saving modes. The operations of 1305 may be performed in accordance with examples as disclosed herein. In some examples, aspects of the operations of 1305 may be performed by a control signaling component 725 as described herein with reference to FIG. 7.

At 1310, the method may comprise switching from the first energy saving mode to a second energy saving mode. The operations of 1310 may be performed in accordance with examples as disclosed herein. In some examples, aspects of the operations of 1310 may be performed by an energy saving mode component 730 as described herein with reference to FIG. 7.

At 1315, the method may comprise switching from the first monitoring occasion configuration corresponding to the first energy saving mode to a second monitoring occasion configuration corresponding to the second energy saving mode based at least in part on switching from the first energy saving mode to the second energy saving mode. The operations of 1315 may be performed in accordance with examples as disclosed herein. In some examples, aspects of the operations of 1315 may be performed by a monitoring occasion component 735 as described herein with reference to FIG. 7.

At 1320, the method may comprise monitoring a control channel in accordance with the second monitoring occasion configuration. The operations of 1320 may be performed in accordance with examples as disclosed herein. In some examples, aspects of the operations of 1320 may be performed by a monitoring component 740 as described herein with reference to FIG. 7.

Figure 14:
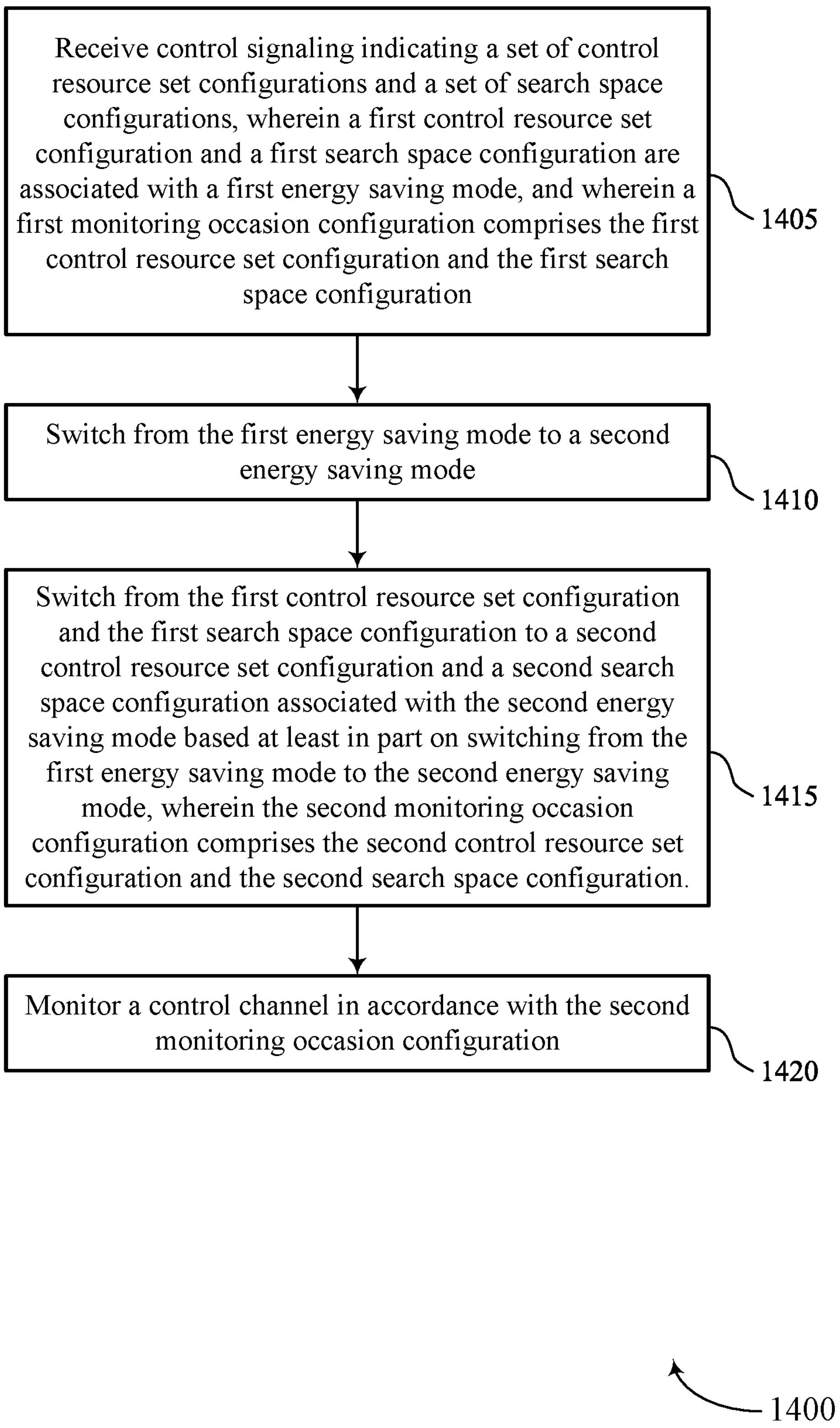

FIG. 14 shows a flowchart illustrating a method 1400 that supports control channel monitoring adaptation under a sequence of network operations in accordance with one or more aspects of the present disclosure. The operations of the method 1400 may be implemented by a UE or its components as described herein. For example, the operations of the method 1400 may be performed by a UE 115 as described herein with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may comprise receiving control signaling indicating a set of CORESET configurations and a set of search space configurations, wherein a first CORESET configuration and a first search space configuration are associated with a first energy saving mode, and wherein a first monitoring occasion configuration comprises the first CORESET configuration and the first search space configuration. The operations of 1405 may be performed in accordance with examples as disclosed herein. In some examples, aspects of the operations of 1405 may be performed by a CORESET and search space component 745 as described herein with reference to FIG. 7.

At 1410, the method may comprise switching from the first energy saving mode to a second energy saving mode. The operations of 1410 may be performed in accordance with examples as disclosed herein. In some examples, aspects of the operations of 1410 may be performed by an energy saving mode component 730 as described herein with reference to FIG. 7.

At 1415, the method may comprise switching from the first CORESET configuration and the first search space configuration to a second CORESET configuration and a second search space configuration associated with the second energy saving mode based at least in part on switching from the first energy saving mode to the second energy saving mode, wherein the second monitoring occasion configuration comprises the second CORESET configuration and the second search space configuration. The operations of 1415 may be performed in accordance with examples as disclosed herein. In some examples, aspects of the operations of 1415 may be performed by a monitoring occasion component 735 as described herein with reference to FIG. 7.

At 1420, the method may comprise monitoring a control channel in accordance with the second monitoring occasion configuration. The operations of 1420 may be performed in accordance with examples as disclosed herein. In some examples, aspects of the operations of 1420 may be performed by a monitoring component 740 as described herein with reference to FIG. 7.

Figure 15:
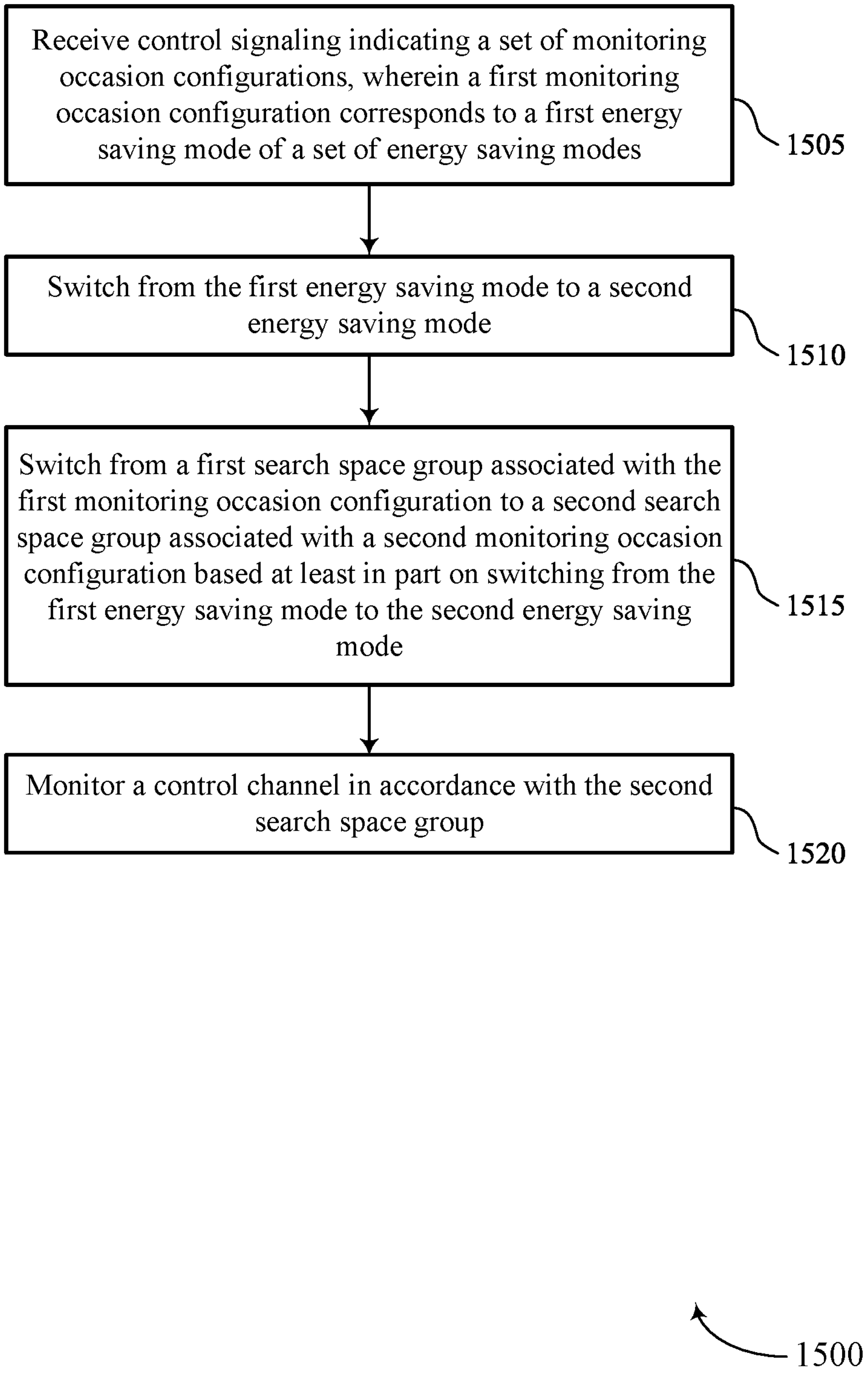

FIG. 15 shows a flowchart illustrating a method 1500 that supports control channel monitoring adaptation under a sequence of network operations in accordance with one or more aspects of the present disclosure. The operations of the method 1500 may be implemented by a UE or its components as described herein. For example, the operations of the method 1500 may be performed by a UE 115 as described herein with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may comprise receiving control signaling indicating a set of monitoring occasion configurations, wherein a first monitoring occasion configuration corresponds to a first energy saving mode of a set of energy saving modes. The operations of 1505 may be performed in accordance with examples as disclosed herein. In some examples, aspects of the operations of 1505 may be performed by a control signaling component 725 as described herein with reference to FIG. 7.

At 1510, the method may comprise switching from the first energy saving mode to a second energy saving mode. The operations of 1510 may be performed in accordance with examples as disclosed herein. In some examples, aspects of the operations of 1510 may be performed by an energy saving mode component 730 as described herein with reference to FIG. 7.

At 1515, the method may comprise switching from a first search space group associated with the first monitoring occasion configuration to a second search space group associated with a second monitoring occasion configuration based at least in part on switching from the first energy saving mode to the second energy saving mode. The operations of 1515 may be performed in accordance with examples as disclosed herein. In some examples, aspects of the operations of 1515 may be performed by a search space group component 750 as described herein with reference to FIG. 7.

At 1520, the method may comprise monitoring a control channel in accordance with the second search space group. The operations of 1520 may be performed in accordance with examples as disclosed herein. In some examples, aspects of the operations of 1520 may be performed by a search space group component 750 as described herein with reference to FIG. 7.

FIG. 16 shows a flowchart illustrating a method 1600 that supports control channel monitoring adaptation under a sequence of network operations in accordance with one or more aspects of the present disclosure. The operations of the method 1600 may be implemented by a network entity or its components as described herein. For example, the operations of the method 1600 may be performed by a network entity as described herein with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may comprise transmitting control signaling indicating a set of monitoring occasion configurations, wherein a first monitoring occasion configuration is associated with a first energy saving mode of a set of energy saving modes, and wherein a second monitoring occasion configuration is associated with a second energy saving mode of the set of energy saving modes. The operations of 1605 may be performed in accordance with examples as disclosed herein. In some examples, aspects of the operations of 1605 may be performed by a configuration component 1125 as described herein with reference to FIG. 11.

At 1610, the method may comprise transmitting a control channel in accordance with the second monitoring occasion configuration based at least in part on a UE switching from the first energy saving mode to the second energy saving mode. The operations of 1610 may be performed in accordance with examples as disclosed herein. In some examples, aspects of the operations of 1610 may be performed by a control channel component 1130 as described herein with reference to FIG. 11.

FIG. 17 shows a flowchart illustrating a method 1700 that supports control channel monitoring adaptation under a sequence of network operations in accordance with one or more aspects of the present disclosure. The operations of the method 1700 may be implemented by a network entity or its components as described herein. For example, the operations of the method 1700 may be performed by a network entity as described herein with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may comprise transmitting control signaling indicating a distribution associated with a second monitoring occasion configuration that indicates a set of intervals across an active time of a second energy saving mode, wherein an interval of the set of intervals comprises one or more monitoring occasions, and wherein the distribution is based at least in part on sub-sampling the one or more monitoring occasions, muting the one or more monitoring occasions, or both. The operations of 1705 may be performed in accordance with examples as disclosed herein. In some examples, aspects of the operations of 1705 may be performed by an interval component 1145 as described herein with reference to FIG. 11.

At 1710, the method may comprise transmitting a control channel in accordance with the second monitoring occasion configuration based at least in part on a UE switching from the first energy saving mode to the second energy saving mode. The operations of 1710 may be performed in accordance with examples as disclosed herein. In some examples, aspects of the operations of 1710 may be performed by a control channel component 1130 as described herein with reference to FIG. 11.

The following provides an overview of aspects of the present disclosure:

Aspect 1: A method for wireless communication at a UE, comprising: receiving control signaling indicating a set of monitoring occasion configurations, wherein a first monitoring occasion configuration corresponds to a first energy saving mode of a set of energy saving modes; switching from the first energy saving mode to a second energy saving mode; switching from the first monitoring occasion configuration corresponding to the first energy saving mode to a second monitoring occasion configuration corresponding to the second energy saving mode based at least in part on switching from the first energy saving mode to the second energy saving mode; and monitoring a control channel in accordance with the second monitoring occasion configuration.

Aspect 2: The method of aspect 1, wherein receiving the control signaling comprises: receiving the control signaling indicating a set of CORESET configurations and a set of search space configurations, wherein a first CORESET configuration and a first search space configuration are associated with the first energy saving mode, and wherein the first monitoring occasion configuration comprises the first CORESET configuration and the first search space configuration.

Aspect 3: The method of any of aspects 1 through 2, wherein switching from the first monitoring occasion configuration to the second monitoring occasion configuration comprises: switching from a first CORESET configuration and a first search space configuration to a second CORESET configuration and a second search space configuration associated with the second energy saving mode based at least in part on switching from the first energy saving mode to the second energy saving mode, wherein the second monitoring occasion configuration comprises the second CORESET configuration and the second search space configuration.

Aspect 4: The method of any of aspects 1 through 3, further comprising: switching from a first search space group associated with the first monitoring occasion configuration to a second search space group associated with the second monitoring occasion configuration based at least in part on switching from the first energy saving mode to the second energy saving mode; and monitoring the control channel in accordance with the second search space group.

Aspect 5: The method of any of aspects 1 through 4, wherein receiving the control signaling comprises: receiving the control signaling indicating one or more offsets, wherein the second monitoring occasion configuration is based at least in part on at least one or the one or more offsets being applied to a BWP configuration.

Aspect 6: The method of aspect 5, wherein the one or more offsets comprises a time offset, a frequency offset, a periodicity offset, or any combination thereof.

Aspect 7: The method of any of aspects 1 through 6, wherein receiving the control signaling comprises: receiving the control signaling indicating a periodicity of the second monitoring occasion configuration, wherein the periodicity is based at least in part on a BWP configuration and a periodicity offset.

Aspect 8: The method of any of aspects 1 through 7, wherein receiving the control signaling comprises: receiving the control signaling indicating a distribution associated with the second monitoring occasion configuration that indicates a set of intervals across an active time of the second energy saving mode, wherein an interval of the set of intervals comprises one or more monitoring occasions.

Aspect 9: The method of aspect 8, wherein the distribution is based at least in part on sub-sampling the one or more monitoring occasions, muting the one or more monitoring occasions, or both.

Aspect 10: A method for wireless communication at a network entity, comprising: transmitting control signaling indicating a set of monitoring occasion configurations, wherein a first monitoring occasion configuration is associated with a first energy saving mode of a set of energy saving modes, and wherein a second monitoring occasion configuration is associated with a second energy saving mode of the set of energy saving modes; and transmitting a control channel in accordance with the second monitoring occasion configuration based at least in part on a UE switching from the first energy saving mode to the second energy saving mode.

Aspect 11: The method of aspect 10, wherein transmitting the control signaling comprises: transmitting the control signaling indicating a set of CORESET configurations and a set of search space configurations, wherein a first CORESET configuration and a first search space configuration are associated with the first energy saving mode, and wherein the first monitoring occasion configuration comprises the first CORESET configuration and the first search space configuration.

Aspect 12: The method of any of aspects 10 through 11, wherein transmitting the control signaling comprises: transmitting the control signaling indicating one or more offsets, wherein the second monitoring occasion configuration is based at least in part on at least one or the one or more offsets being applied to a BWP configuration.

Aspect 13: The method of aspect 12, wherein the one or more offsets comprises a time offset, a frequency offset, a periodicity offset, or any combination thereof.

Aspect 14: The method of any of aspects 10 through 13, wherein transmitting the control signaling comprises: transmitting the control signaling indicating a periodicity of the second monitoring occasion configuration, wherein the periodicity is based at least in part on a BWP configuration and a periodicity offset.

Aspect 15: The method of any of aspects 10 through 14, wherein transmitting the control signaling comprises: transmitting the control signaling indicating a distribution associated with the second monitoring occasion configuration that indicates a set of intervals across an active time of the second energy saving mode, wherein an interval of the set of intervals comprises one or more monitoring occasions.

Aspect 16: The method of aspect 15, wherein the distribution is based at least in part on sub-sampling the one or more monitoring occasions, muting the one or more monitoring occasions, or both.

Aspect 17: An apparatus for wireless communication at a UE, comprising a processor; and a memory coupled with the processor, with instructions stored in the memory, the instructions executable by the processor to cause the apparatus to perform a method of any of aspects 1 through 9.

Aspect 18: An apparatus for wireless communication at a UE, comprising at least one means for performing a method of any of aspects 1 through 9.

Aspect 19: A non-transitory computer-readable medium storing code for wireless communication at a UE, the code comprising instructions executable by a processor to perform a method of any of aspects 1 through 9.

Aspect 20: An apparatus for wireless communication at a network entity, comprising a processor; and a memory coupled with the processor, with instructions stored in the memory, the instructions executable by the processor to cause the apparatus to perform a method of any of aspects 10 through 16.

Aspect 21: An apparatus for wireless communication at a network entity, comprising at least one means for performing a method of any of aspects 10 through 16.

Aspect 22: A non-transitory computer-readable medium storing code for wireless communication at a network entity, the code comprising instructions executable by a processor to perform a method of any of aspects 10 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving control signaling that indicates:

a set of monitoring occasion configurations comprising a first monitoring occasion configuration and a second monitoring occasion configuration, a set of energy saving modes comprising a first energy saving mode and a second energy saving mode, wherein the first energy saving mode corresponds to a first set of operations and the second energy saving mode corresponds to a second set of operations different from the first set of operations, and a linking between the set of monitoring occasion configurations and the set of energy saving modes, wherein the first monitoring occasion configuration corresponds to the first energy saving mode in accordance with the linking, and wherein the second monitoring occasion configuration corresponds to the second energy saving mode in accordance with the linking;

switching from the first energy saving mode to the second energy saving mode without signaling indicating that the UE is to operate in the second energy saving mode, wherein switching from the first energy saving mode to the second energy saving mode comprises switching from the first set of operations to the second set of operations;

switching from the first monitoring occasion configuration corresponding to the first energy saving mode to the second monitoring occasion configuration corresponding to the second energy saving mode based at least in part on switching from the first energy saving mode to the second energy saving mode and based at least in part on the linking; and monitoring a control channel in accordance with the second monitoring occasion configuration.

2. The method of claim 1, wherein receiving the control signaling comprises:

receiving the control signaling indicating a set of control resource set configurations and a set of search space configurations, wherein a first control resource set configuration and a first search space configuration correspond to the first energy saving mode, and wherein the first monitoring occasion configuration comprises the first control resource set configuration and the first search space configuration.

3. The method of claim 1, wherein switching from the first monitoring occasion configuration to the second monitoring occasion configuration comprises:

switching from a first control resource set configuration and a first search space configuration to a second control resource set configuration and a second search space configuration corresponding to the second energy saving mode based at least in part on switching from the first energy saving mode to the second energy saving mode, wherein the second monitoring occasion configuration comprises the second control resource set configuration and the second search space configuration.

4. The method of claim 1, further comprising:

switching from a first search space group corresponding to the first monitoring occasion configuration to a second search space group corresponding to the second monitoring occasion configuration based at least in part on switching from the first energy saving mode to the second energy saving mode; and monitoring the control channel in accordance with the second search space group.

5. The method of claim 1, wherein receiving the control signaling comprises:

receiving the control signaling indicating one or more offsets, wherein the second monitoring occasion configuration is based at least in part on at least one of the one or more offsets being applied to a BWP configuration.

6. The method of claim 5, wherein the one or more offsets comprises a time offset, a frequency offset, a periodicity offset, or any combination thereof.

7. The method of claim 1, wherein receiving the control signaling comprises:

receiving the control signaling indicating a periodicity of the second monitoring occasion configuration, wherein the periodicity is based at least in part on a BWP configuration and a periodicity offset.

8. The method of claim 1, wherein receiving the control signaling comprises:

receiving the control signaling indicating a distribution associated with the second monitoring occasion configuration that indicates a set of intervals across an active time of the second energy saving mode, wherein an interval of the set of intervals comprises one or more monitoring occasions.

9. The method of claim 8, wherein the distribution is based at least in part on sub-sampling the one or more monitoring occasions, muting the one or more monitoring occasions, or both.

10. The method of claim 1, wherein the first set of operations comprises usage of a first quantity of antennas, and wherein the second set of operations comprises usage of a second quantity of antennas different from the first quantity of antennas.

11. A method for wireless communication at a network entity, comprising:

transmitting control signaling that indicates:

a set of monitoring occasion configurations comprising a first monitoring occasion configuration and a second monitoring occasion configuration, a set of energy saving modes comprising a first energy saving mode and a second energy saving mode, wherein the first energy saving mode corresponds to a first set of operations and the second energy saving mode corresponds to a second set of operations different from the first set of operations, and a linking between the set of monitoring occasion configurations and the set of energy saving modes, wherein the first monitoring occasion configuration corresponds to the first energy saving mode in accordance with the linking, and wherein the second monitoring occasion configuration corresponds to the second energy saving mode in accordance with the linking; and transmitting a control channel in accordance with the second monitoring occasion configuration based at least in part on a user equipment (UE) switching from the first energy saving mode to the second energy saving mode without signaling indicating that the UE is to operate in the second energy saving mode, wherein switching from the first energy saving mode to the second energy saving mode comprises switching from the first set of operations to the second set of operations, and based at least in part on the linking.

12. The method of claim 11, wherein transmitting the control signaling comprises:

transmitting the control signaling indicating a set of control resource set configurations and a set of search space configurations, wherein a first control resource set configuration and a first search space configuration correspond to the first energy saving mode, and wherein the first monitoring occasion configuration comprises the first control resource set configuration and the first search space configuration.

13. The method of claim 11, wherein transmitting the control signaling comprises:

transmitting the control signaling indicating one or more offsets, wherein the second monitoring occasion configuration is based at least in part on at least one of the one or more offsets being applied to a BWP configuration.

14. The method of claim 13, wherein the one or more offsets comprises a time offset, a frequency offset, a periodicity offset, or any combination thereof.

15. The method of claim 11, wherein transmitting the control signaling comprises:

transmitting the control signaling indicating a periodicity of the second monitoring occasion configuration, wherein the periodicity is based at least in part on a BWP configuration and a periodicity offset.

16. The method of claim 11, wherein transmitting the control signaling comprises:

transmitting the control signaling indicating a distribution associated with the second monitoring occasion configuration that indicates a set of intervals across an active time of the second energy saving mode, wherein an interval of the set of intervals comprises one or more monitoring occasions.

17. The method of claim 16, wherein the distribution is based at least in part on sub-sampling the one or more monitoring occasions, muting the one or more monitoring occasions, or both.

18. An apparatus for wireless communication at a user equipment (UE), comprising:

at least one processor; and at least one memory coupled with the at least one processor, with instructions stored in the at least one memory, the instructions being executable by the at least one processor to cause the apparatus to:

receive control signaling that indicates:

a set of monitoring occasion configurations comprising a first monitoring occasion configuration and a second monitoring occasion configuration, a set of energy saving modes comprising a first energy saving mode and a second energy saving mode, wherein the first energy saving mode corresponds to a first set of operations and the second energy saving mode corresponds to a second set of operations different from the first set of operations, and a linking between the set of monitoring occasion configurations and the set of energy saving modes, wherein the first monitoring occasion configuration corresponds to the first energy saving mode in accordance with the linking, and wherein the second monitoring occasion configuration corresponds to the second energy saving mode in accordance with the linking;

switch from the first energy saving mode to the second energy saving mode without signaling indicating that the UE is to operate in the second energy saving mode, wherein switching from the first energy saving mode to the second energy saving mode comprises switching from the first set of operations to the second set of operations;

switch from the first monitoring occasion configuration corresponding to the first energy saving mode to the second monitoring occasion configuration corresponding to the second energy saving mode based at least in part on switching from the first energy saving mode to the second energy saving mode and based at least in part on the linking; and monitor a control channel in accordance with the second monitoring occasion configuration.

19. The apparatus of claim 18, wherein the instructions to receive the control signaling are executable by the at least one processor to cause the apparatus to:

receive the control signaling indicating a set of control resource set configurations and a set of search space configurations, wherein a first control resource set configuration and a first search space configuration correspond to the first energy saving mode, and wherein the first monitoring occasion configuration comprises the first control resource set configuration and the first search space configuration.

20. The apparatus of claim 18, wherein the instructions to switch from the first monitoring occasion configuration to the second monitoring occasion configuration are executable by the at least one processor to cause the apparatus to:

switch from a first control resource set configuration and a first search space configuration to a second control resource set configuration and a second search space configuration corresponding to the second energy saving mode based at least in part on switching from the first energy saving mode to the second energy saving mode, wherein the second monitoring occasion configuration comprises the second control resource set configuration and the second search space configuration.

21. The apparatus of claim 18, wherein the instructions are further executable by the at least one processor to cause the apparatus to:

switch from a first search space group corresponding to the first monitoring occasion configuration to a second search space group corresponding to the second monitoring occasion configuration based at least in part on switching from the first energy saving mode to the second energy saving mode; and monitor the control channel in accordance with the second search space group.

22. The apparatus of claim 18, wherein the instructions to receive the control signaling are executable by the at least one processor to cause the apparatus to:

receive the control signaling indicating one or more offsets, wherein the second monitoring occasion configuration is based at least in part on at least one of the one or more offsets being applied to a BWP configuration.

23. The apparatus of claim 22, wherein the one or more offsets comprises a time offset, a frequency offset, a periodicity offset, or any combination thereof.

24. The apparatus of claim 18, wherein the instructions to receive the control signaling are executable by the at least one processor to cause the apparatus to receive the control signaling indicating a periodicity of the second monitoring occasion configuration, wherein the periodicity is based at least in part on a BWP configuration and a periodicity offset.

25. The apparatus of claim 18, wherein the instructions to receive the control signaling are executable by the at least one processor to cause the apparatus to:

receive the control signaling indicating a distribution associated with the second monitoring occasion configuration that indicates a set of intervals across an active time of the second energy saving mode, wherein an interval of the set of intervals comprises one or more monitoring occasions.

26. An apparatus for wireless communication at a network entity, comprising:

at least one processor; and at least one memory coupled with the at least one processor, with instructions stored in the at least one memory, the instructions being executable by the at least one processor to cause the apparatus to:

transmit control signaling that indicates:

a set of monitoring occasion configurations comprising a first monitoring occasion configuration and a second monitoring occasion configuration, a set of energy saving modes comprising a first energy saving mode and a second energy saving mode, wherein the first energy saving mode corresponds to a first set of operations and the second energy saving mode corresponds to a second set of operations different from the first set of operations, and a linking between the set of monitoring occasion configurations and the set of energy saving modes, wherein the first monitoring occasion configuration corresponds to the first energy saving mode in accordance with the linking, and wherein the second monitoring occasion configuration corresponds to the second energy saving mode in accordance with the linking; and transmit a control channel in accordance with the second monitoring occasion configuration based at least in part on a user equipment (UE) switching from the first energy saving mode to the second energy saving mode without signaling indicating that the UE is to operate in the second energy saving mode, wherein switching from the first energy saving mode to the second energy saving mode comprises switching from the first set of operations to the second set of operations, and based at least in part on the linking.

27. The apparatus of claim 26, wherein the instructions to transmit the control signaling are executable by the at least one processor to cause the apparatus to:

transmit the control signaling indicating a set of control resource set configurations and a set of search space configurations, wherein a first control resource set configuration and a first search space configuration correspond to the first energy saving mode, and wherein the first monitoring occasion configuration comprises the first control resource set configuration and the first search space configuration.

28. The apparatus of claim 26, wherein the instructions to transmit the control signaling are executable by the at least one processor to cause the apparatus to:

transmit the control signaling indicating one or more offsets, wherein the second monitoring occasion configuration is based at least in part on at least one of the one or more offsets being applied to a BWP configuration.

29. The apparatus of claim 28, wherein the one or more offsets comprises a time offset, a frequency offset, a periodicity offset, or any combination thereof.

30. The apparatus of claim 26, wherein the instructions to transmit the control signaling are executable by the at least one processor to cause the apparatus to:

transmit the control signaling indicating a periodicity of the second monitoring occasion configuration, wherein the periodicity is based at least in part on a BWP configuration and a periodicity offset.

* * * * *